US012656867B2

(12) United States Patent
Zhang et al.

(10) Patent No.: US 12,656,867 B2
(45) Date of Patent: Jun. 16, 2026

(54) TECHNOLOGIES FOR RADIOMYOGRAPHY GESTURE RECOGNITION FOR HUMAN-COMPUTER INTERACTION

(71) Applicant: Cornell University, Ithaca, NY (US)

(72) Inventors: Zijing Zhang, Ithaca, NY (US); Edwin Kan, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 18/981,400

(22) Filed: Dec. 13, 2024

(65) Prior Publication Data

US 2025/0110556 A1      Apr. 3, 2025

Related U.S. Application Data

(63) Continuation-in-part of application No. PCT/US2023/025276, filed on Jun. 14, 2023.

(60) Provisional application No. 63/670,352, filed on Jul. 12, 2024, provisional application No. 63/352,193, filed on Jun. 14, 2022.

(51) Int. Cl.
G06F 3/01 (2006.01)

(52) U.S. Cl.
CPC .............. G06F 3/015 (2013.01); G06F 3/017 (2013.01)

(58) Field of Classification Search
CPC ................................. G06F 3/015; G06F 3/017
USPC ........................................................ 345/156
See application file for complete search history.

(56) References Cited

U.S. PATENT DOCUMENTS

| | | | | |
|---|---|---|---|---|
| 8,187,209 B1* | 5/2012 | Giuffrida | ............. | A61B 5/4839 |
| | | | | 600/595 |
| 8,892,479 B2* | 11/2014 | Tan | ......................... | G06F 3/017 |
| | | | | 706/62 |
| 9,864,428 B2* | 1/2018 | Zhang | ..................... | G06F 3/014 |
| 2017/0235369 A1* | 8/2017 | Acer | ....................... | G06F 3/017 |
| | | | | 345/173 |
| 2021/0241908 A1 | 8/2021 | Ciupa et al. | | |
| 2021/0397256 A1* | 12/2021 | Barachant | ................ | G06N 3/09 |
| 2021/0397267 A1 | 12/2021 | Ang et al. | | |

OTHER PUBLICATIONS

International Search Report and Written Opinion for PCT/US23/25276, dated Jul. 9, 2023, 8 pages.

(Continued)

*Primary Examiner* — Calvin C Ma
(74) *Attorney, Agent, or Firm* — Barnes & Thornburg

(57) ABSTRACT

Technologies for radiomyography gesture recognition include a computing device coupled to a radio near-field sensor device including multiple transmitting and receiving antennas. The computing device transmits multiple radio frequency signals with the sensor device, which is positioned near the muscle area of interest for a user. The sensor device may include a cuff or armband that surrounds the forearm of the user. The computing device receives multiple time-domain signals with the receiving antennas and classifies the signals with a trained machine learning model to generate one or more distinct states, such as a gesture or posture classification. The computing device may transform each time-domain signal to a two-dimensional spectrogram and classify the two-dimensional spectrogram with a vision-based model such as a vision transformer model. Other embodiments are described and claimed.

20 Claims, 13 Drawing Sheets

(56) References Cited

OTHER PUBLICATIONS

Ibrahim Almohimeed et al., Ultrasound Measurement of Skeletal Muscle Contractile Paramaters Using Flexible and Wearable Single-Element Ultrasonic Sensor, www.mdpi.com/journal/sensors, Jun. 27, 2020, 20 pages.

* cited by examiner

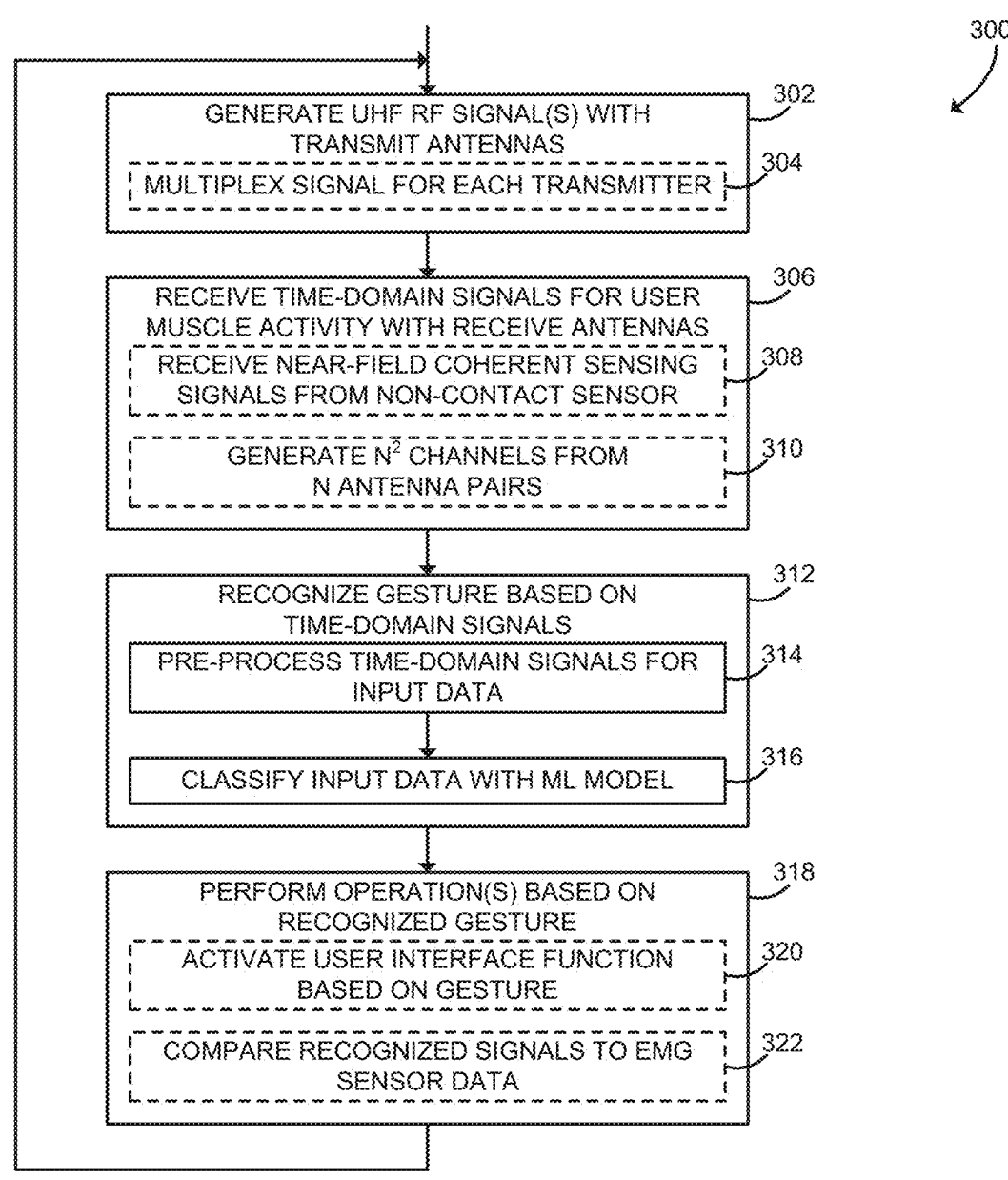

300

302 GENERATE UHF RF SIGNAL(S) WITH TRANSMIT ANTENNAS

304 MULTIPLEX SIGNAL FOR EACH TRANSMITTER

306 RECEIVE TIME-DOMAIN SIGNALS FOR USER MUSCLE ACTIVITY WITH RECEIVE ANTENNAS

308 RECEIVE NEAR-FIELD COHERENT SENSING SIGNALS FROM NON-CONTACT SENSOR

310 GENERATE $N^2$ CHANNELS FROM N ANTENNA PAIRS

312 RECOGNIZE GESTURE BASED ON TIME-DOMAIN SIGNALS

314 PRE-PROCESS TIME-DOMAIN SIGNALS FOR INPUT DATA

316 CLASSIFY INPUT DATA WITH ML MODEL

318 PERFORM OPERATION(S) BASED ON RECOGNIZED GESTURE

320 ACTIVATE USER INTERFACE FUNCTION BASED ON GESTURE

322 COMPARE RECOGNIZED SIGNALS TO EMG SENSOR DATA

FIG. 3

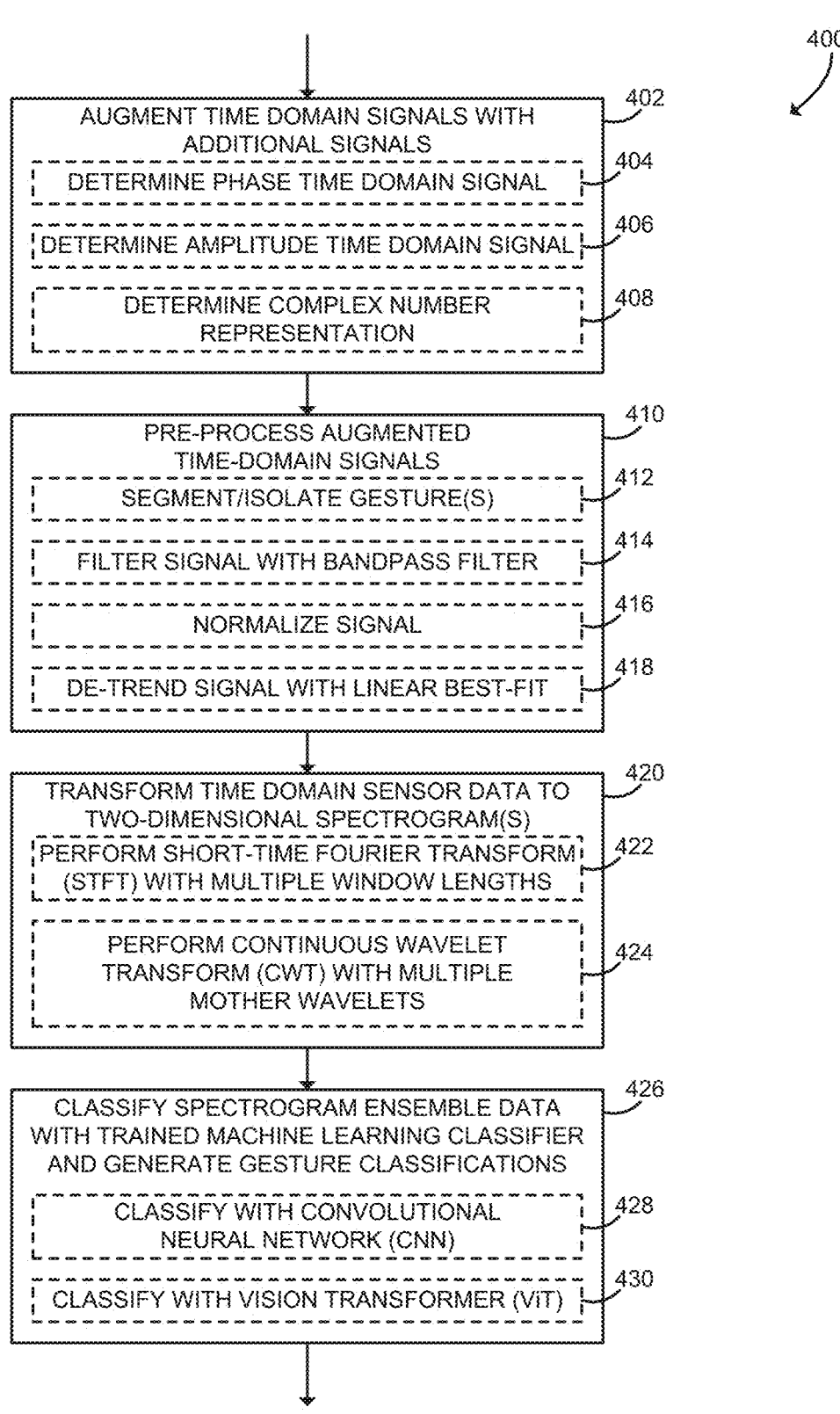

400

AUGMENT TIME DOMAIN SIGNALS WITH ADDITIONAL SIGNALS — 402

DETERMINE PHASE TIME DOMAIN SIGNAL — 404

DETERMINE AMPLITUDE TIME DOMAIN SIGNAL — 406

DETERMINE COMPLEX NUMBER REPRESENTATION — 408

PRE-PROCESS AUGMENTED TIME-DOMAIN SIGNALS — 410

SEGMENT/ISOLATE GESTURE(S) — 412

FILTER SIGNAL WITH BANDPASS FILTER — 414

NORMALIZE SIGNAL — 416

DE-TREND SIGNAL WITH LINEAR BEST-FIT — 418

TRANSFORM TIME DOMAIN SENSOR DATA TO TWO-DIMENSIONAL SPECTROGRAM(S) — 420

PERFORM SHORT-TIME FOURIER TRANSFORM (STFT) WITH MULTIPLE WINDOW LENGTHS — 422

PERFORM CONTINUOUS WAVELET TRANSFORM (CWT) WITH MULTIPLE MOTHER WAVELETS — 424

CLASSIFY SPECTROGRAM ENSEMBLE DATA WITH TRAINED MACHINE LEARNING CLASSIFIER AND GENERATE GESTURE CLASSIFICATIONS — 426

CLASSIFY WITH CONVOLUTIONAL NEURAL NETWORK (CNN) — 428

CLASSIFY WITH VISION TRANSFORMER (ViT) — 430

FIG. 4

|   | U | D | R | L |
|---|---|---|---|---|
| U | 0.97 | 0.03 |  |  |
| D | 0.03 | 0.91 | 0.03 | 0.02 |
| R |  | 0.05 | 0.93 |  |
| L | 0.02 |  | 0.02 | 0.95 |

1

TECHNOLOGIES FOR RADIOMYOGRAPHY GESTURE RECOGNITION FOR HUMAN-COMPUTER INTERACTION

CROSS-REFERENCE TO RELATED APPLICATIONS

This application is a continuation-in-part of International Application PCT/US2023/025276, entitled "TECHNOLO-GIES FOR RADIOMYOGRAPHY GESTURE RECOGNI-TION FOR HUMAN-COMPUTER INTERACTION," filed Jun. 14, 2023, which claims benefit of and priority to U.S. Patent Application No. 63/352,193, entitled "RADIO-MYOGRAPHY: ACCURATE HAND GESTURE RECOG-NITION BY FOREARM WEARABLE RADIO SEN-SORS," filed on Jun. 14, 2022; this application further claims benefit of and priority to U.S. Patent Application No. 63/670,352, entitled "RMG ON EYEGLASSES TO TRACK EYE, FACIAL MOTION, AND RESPIRATION," filed on Jul. 12, 2024, each of the above related applications are incorporated herein by reference in their entirety.

BACKGROUND

Hand gestures provide effective non-verbal communica-tion and may help deliver intuitive interactions to machines. Technologies in hand gesture recognition (HGR) may be used to facilitate human computer interaction (HCI). For example, HGR may be applied to various applications including 3D virtual reality control; sign-language detection for hard of hearing persons; assistive robotic control; com-munication in hostile environment such as fire and covert operations; and non-contact navigation and infotainment in smart cars. Typical vision-based methods for HGR may use an off-body camera and thus contend with occlusion, com-plexity, and restricted capture volume. Other typical contact-based devices, such as surface electromyography (sEMG), may be uncomfortable, inaccurate, and restricted to a small number of gestures.

SUMMARY

According to one aspect of the disclosure, a near-field radio sensing system for identifying muscle contraction of a user comprises a sensor device comprising a plurality of transmit antennas and a corresponding plurality of receive antennas; and a computing device coupled to the sensor device. The computing device comprises a sensor driver and a classifier. The sensor driver is to transmit a plurality of radio frequency signals with the transmit antennas of the sensor device, wherein a near field of the plurality of radio frequency signals couples with selected soft tissue of a body part of the user, and to receive a plurality of time-domain signals with the receive antennas of the sensor device in response to transmission of the plurality of radio frequency signals. The classifier is to classify the plurality of time-domain signals with a trained machine learning model into one or more distinct states, selected from a plurality of distinct states of the selected soft tissue corresponding to the received plurality of time-domain signals. The trained machine learning model comprises a deep neural network.

In an embodiment, the sensor device is configured for securement to a limb of a user to extend from a first portion of the limb to a second portion of the limb to dispose the plurality of transmit antennas and the plurality of receive antennas adjacent the limb so that the near field of the plurality of radio frequency signals couples with muscles of the limb. In an embodiment, at least some of the plurality of transmit antennas and the plurality of receive antennas of the sensor device are spaced apart along at least a portion of a length of the sensor device. In an embodiment, at least some of the plurality of transmit antennas and the plurality of receive antennas are spaced apart circumferentially about at least a portion of a circumference of the sensor device. In an embodiment, the plurality of transmit antennas and the plurality of receive antennas comprise (i) a first pair of transmit antenna and receive antenna disposed at a first position of the sensor device to direct radio frequency signals to a user's extensor pollicis longus and a flexor pollicis longus, (ii) a second pair of transmit antenna and receive antenna disposed at a second position of the sensor device to direct radio frequency signals to a user's extensor muscles that produce extension of wrist and fingers, (iii) a third pair of transmit antenna and receive antenna disposed at a third position of the sensor device to direct radio frequency signals to a user's flexion muscles that produce pronation of the arm and flexion of wrist and fingers, and (iv) a fourth pair of transmit antenna and receive antenna dis-posed at a fourth position of the sensor device to direct radio frequency signals to a user's flexor digitorum profundus. In an embodiment, the sensor device comprises a cuff configured for attachment to a forearm, and wherein the classifier is configured to classify the plurality of time-domain signals with a trained machine learning model into a plurality of distinct states of the selected soft tissue of the forearm corresponding to a plurality of hand gestures.

In an embodiment, the one or more distinct states com-prises a type of voluntary movement comprising predeter-mined motion of one or more fingers, a wrist, or a hand. In an embodiment, the one or more distinct states comprise a type of voluntary movement for an air-writing gesture of a letter, number, or symbol.

In an embodiment, each of the plurality of transmit antennas and the plurality of receive antennas comprises a monopole whip antenna or a coaxial cable with a notch structure. In an embodiment, to receive the plurality of time-domain signals comprises to receive near-field coher-ent sensing signals. In an embodiment, the radio frequency signal has a carrier frequency of about 900 MHz, about 2.4 GHz, or between about 900 MHz and 2.4 GHz. In an embodiment, to transmit the plurality of radio frequency signals with the plurality of transmit antennas comprises to multiplex the plurality of radio frequency signals. In an embodiment, to multiplex the plurality of radio frequency signals comprises to perform frequency-division multiplex-ing or code-division multiplexing.

In an embodiment, the trained machine learning model comprises a convolutional neural network. In an embodi-ment, the trained machine learning model comprises a vision transformer model.

In an embodiment, the computing device further com-prises a model trainer to perform transfer learning on the trained machine learning model with a calibration data set. To classify the plurality of time-domain signals comprises to classify the plurality of time-domain signals in response to performance of the transfer learning. In an embodiment, the model trainer is further to: determine whether a new user is associated with the sensor device or a new orientation is associated with the sensor device, wherein to perform the transfer learning comprises to perform transfer learning in response to a determination that a new user or a new orientation is associated with the sensor device. In an embodiment, the model trainer is further configured to generate the calibration data set by labeling of the plurality of time-domain signals with one or more predetermined gesture classifications.

In an embodiment, the computing device further comprises an interface controller to use the one or more distinct states as an input to a human-computer interface.

In an embodiment, the computing device further comprises an input pre-processor to transform each of the time-domain signals to one or more two-dimensional spectrograms; and the classifier is to classify the plurality of two-dimensional spectrograms with the trained machine learning model to generate the one or more distinct states. In an embodiment, to transform each of the time-domain signals to one or more two-dimensional spectrograms comprises to perform a short-time Fourier transform having a first window length. In an embodiment, to transform each of the time-domain signals to one or more two-dimensional spectrograms further comprises to perform a short-time Fourier transform having a second window length, wherein the second window length is larger than the first window length. In an embodiment, the first window length is about 0.6 s and the second window length is about 1.0 s. In an embodiment, to transform each of the time-domain signals to one or more two-dimensional spectrograms comprises to perform a continuous wavelet transform with a first predetermined mother wavelet. In an embodiment, each of the time-domain signals to one or more two-dimensional spectrograms comprises to perform a plurality of continuous wavelet transforms with a plurality of predetermined mother wavelets. In an embodiment, the plurality of predetermined mother wavelets comprises a Ricker wavelet, a Gaussian wavelet, and a Morelet wavelet.

In an embodiment, the sensor driver is further to demultiplex the plurality of time-domain signals into a plurality of demultiplexed time-domain signals, wherein each of the demultiplexed time-domain signals is associated with a transmit antenna and a receive antenna. In an embodiment, the computing device further comprises an input pre-processor to generate a plurality of augmented time-domain signals based on the demultiplexed time-domain signals; and generate a plurality of pre-processed time-domain signals by pre-processing the augmented time-domain signals; wherein to transform each of the time-domain signals comprises to transform each of the pre-processed time-domain signals. In an embodiment, to generate the plurality of augmented time-domain signals comprises to generate a phase time domain signal for each demultiplexed time-domain signal, an amplitude time domain signal for each demultiplexed time-domain signal, or a complex number signal for each demultiplexed time-domain signal. In an embodiment, to pre-process the augmented time-domain signals comprises to segment the augmented time-domain signals to classify a gesture. In an embodiment, to pre-process the augmented time-domain signals comprises to filter the augmented time-domain signals with a bandpass filter. In an embodiment, the filter has a pass band between about 0.1 Hz to 5 Hz. In an embodiment, to pre-process the augmented time-domain signals comprises to normalize the augmented time-domain signals. In an embodiment, to pre-process the augmented time-domain signals comprises to detrend the augmented time-domain signals by subtraction of a linear best fit line from each augmented time-domain signal.

In an embodiment, the computing device further comprises an input pre-processor to combine the plurality of time-domain signals with sensor data received from a surface electromyography sensor.

According to another aspect, a method for non-contact measuring of soft tissue motion of a user comprises transmitting, using a driver, a plurality of radio frequency signals from a plurality of transmit antennas disposed at a plurality of first locations adjacent a user's body part into the user's body part to cause a near field of the plurality of radio frequency signals to couple inside the user's body part to generate a plurality of time-domain signals; receiving the plurality of time-domain signals with a plurality of receive antennas disposed at a plurality of second locations adjacent the user's body part; and classifying the plurality of time-domain signals, using a computing device with a trained machine learning model, into one or more distinct states, selected from a plurality of distinct states of the selected soft tissue corresponding to the received plurality of time-domain signals, wherein the trained machine learning model comprises a deep neural network.

In an embodiment, the driver, the plurality of transmit antennas, and the plurality of receive antennas are integrated into a sensor device borne in a cuff. In an embodiment, the positioning of the plurality of transmit antennas and the plurality of receive antennas adjacent the user's body part comprises positioning of the plurality of transmit antennas and the plurality of receive antennas adjacent the user's arm, wherein the plurality of distinct states of the selected soft tissue comprise hand gesture classifications, and wherein the plurality of transmit antennas and the plurality of receive antennas are spaced apart along a length of the cuff. In an embodiment, the positioning the plurality of transmit antennas and the plurality of receive antennas adjacent the arm of the user comprises: (i) positioning a first pair of transmit antenna and receive antenna near an extensor pollicis longus and a flexor pollicis longus of the arm, (ii) positioning a second pair of transmit antenna and receive antenna near extensor muscles that produce extension of wrist and fingers, (iii) positioning a third pair of transmit antenna and receive antenna near flexion muscles that produce pronation of the arm and flexion of wrist and fingers, and (iv) positioning a fourth pair of transmit antenna and receive antenna near a flexor digitorum profundus. In an embodiment, the positioning of the plurality of transmit antennas and the plurality of receive antennas adjacent the arm of the user comprises attaching the cuff bearing the plurality of transmit antennas and the plurality of receive antennas to the arm of the user between a wrist and an elbow of the arm, wherein the plurality of transmit antennas and the plurality of receive antennas distributed along a circumference of the cuff. In an embodiment, the body part comprises a plurality of body parts and wherein a first plurality of transmit antennas and a first plurality of receive antennas are integrated into a first cuff configured for securement to a first body part a second plurality of transmit antennas and a second plurality of receive antennas are integrated into a second cuff configured for securement to a second body part.

In an embodiment, each of the plurality of transmit antennas and the plurality of receive antennas comprises a monopole whip antenna or a coaxial cable with a sensing notch structure. In an embodiment, receiving the plurality of time-domain signals comprises receiving near-field coherent sensing signals. In an embodiment, the transmitting comprising transmitting at a frequency of about 900 MHz, about 2.4 GHz, or between about 900 MHz and 2.4 GHz. In an embodiment, transmitting the plurality of radio frequency signals with the plurality of transmit antennas comprises multiplexing the plurality of radio frequency signals. In an embodiment, multiplexing the plurality of radio frequency signals comprises frequency-division multiplexing or code-division multiplexing.

In an embodiment, the trained machine learning model comprises a convolutional neural network. In an embodiment, the trained machine learning model comprises a vision transformer model.

In an embodiment, the method further comprises performing, by a computing device, transfer learning on the trained machine learning model with a calibration data set, wherein classifying the plurality of time-domain signals comprises classifying the plurality of time-domain signals in response to performing transfer learning. In an embodiment, the method further comprises determining, by the computing device, whether a new user is associated with the sensor device or a new orientation is associated with the sensor device; wherein performing transfer learning comprises performing transfer learning in response to determining that a new user or a new orientation is associated with the sensor device. In an embodiment, the method further comprises generating the calibration data set by labeling the plurality of time-domain signals with one or more predetermined gesture classifications.

In an embodiment, the method further comprises using, by the computing device, the one or more distinct states as an input to a human-computer interface.

In an embodiment, classifying the plurality of time-domain signals comprises transforming each of the time-domain signals to one or more two-dimensional spectrograms; and classifying the plurality of two-dimensional spectrograms with the trained machine learning model to generate the one or more distinct states. In an embodiment, transforming each of the time-domain signals to one or more two-dimensional spectrograms comprises performing a short-time Fourier transform having a first window length. In an embodiment, transforming each of the time-domain signals to one or more two-dimensional spectrograms further comprises performing a short-time Fourier transform having a second window length, wherein the second window length is larger than the first window length. In an embodiment, the first window length is about 0.6 s and the second window length is about 1.0 s. In an embodiment, transforming each of the time-domain signals to one or more two-dimensional spectrograms comprises performing a continuous wavelet transform with a first predetermined mother wavelet. In an embodiment, transforming each of the time-domain signals to one or more two-dimensional spectrograms comprises performing a plurality of continuous wavelet transforms with a plurality of predetermined mother wavelets. In an embodiment, the plurality of predetermined mother wavelets comprises a Ricker wavelet, a Gaussian wavelet, and a Morelet wavelet.

In an embodiment, the method further comprises comprising demultiplexing, by the computing device, the plurality of time-domain signals into a plurality of demultiplexed time-domain signals, wherein each of the demultiplexed time-domain signals is associated with a transmit antenna and a receive antenna. In an embodiment, classifying the plurality of time-domain signals further comprises generating a plurality of augmented time-domain signals based on the demultiplexed time-domain signals; and generating a plurality of pre-processed time-domain signals by pre-processing the augmented time-domain signals; wherein transforming each of the time-domain signals comprises transforming each of the pre-processed time-domain signals. In an embodiment, generating the plurality of augmented time-domain signals comprises generating a phase time domain signal for each demultiplexed time-domain signal, an amplitude time domain signal for each demultiplexed time-domain signal, or a complex number signal for each demultiplexed time-domain signal. In an embodiment, pre-processing the augmented time-domain signals comprises segmenting the augmented time-domain signals to isolate a gesture. In an embodiment, pre-processing the augmented time-domain signals comprises filtering the augmented time-domain signals with a bandpass filter. In an embodiment, the filter has a pass band between about 0.1 Hz to 5 Hz. In an embodiment, pre-processing the augmented time-domain signals comprises normalizing the augmented time-domain signals. In an embodiment, pre-processing the augmented time-domain signals comprises detrending the augmented time-domain signals by subtracting a linear best fit line from each augmented time-domain signal.

In an embodiment, the method further comprises combining, by the computing device, the plurality of time-domain signals with sensor data received from a surface electromyography sensor.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 3 is a simplified flow diagram of at least one embodiment of a method for non-contact gesture recognition that may be executed by a computing device of FIGS. 1 and 2;

FIG. 4 is a simplified flow diagram of at least one embodiment of a method for signal pre-processing and ensemble data classification that may be executed by the computing device of FIGS. 1 and 2 in connection with the method of FIG. 3;

DETAILED DESCRIPTION OF THE DRAWINGS

Figure 1:
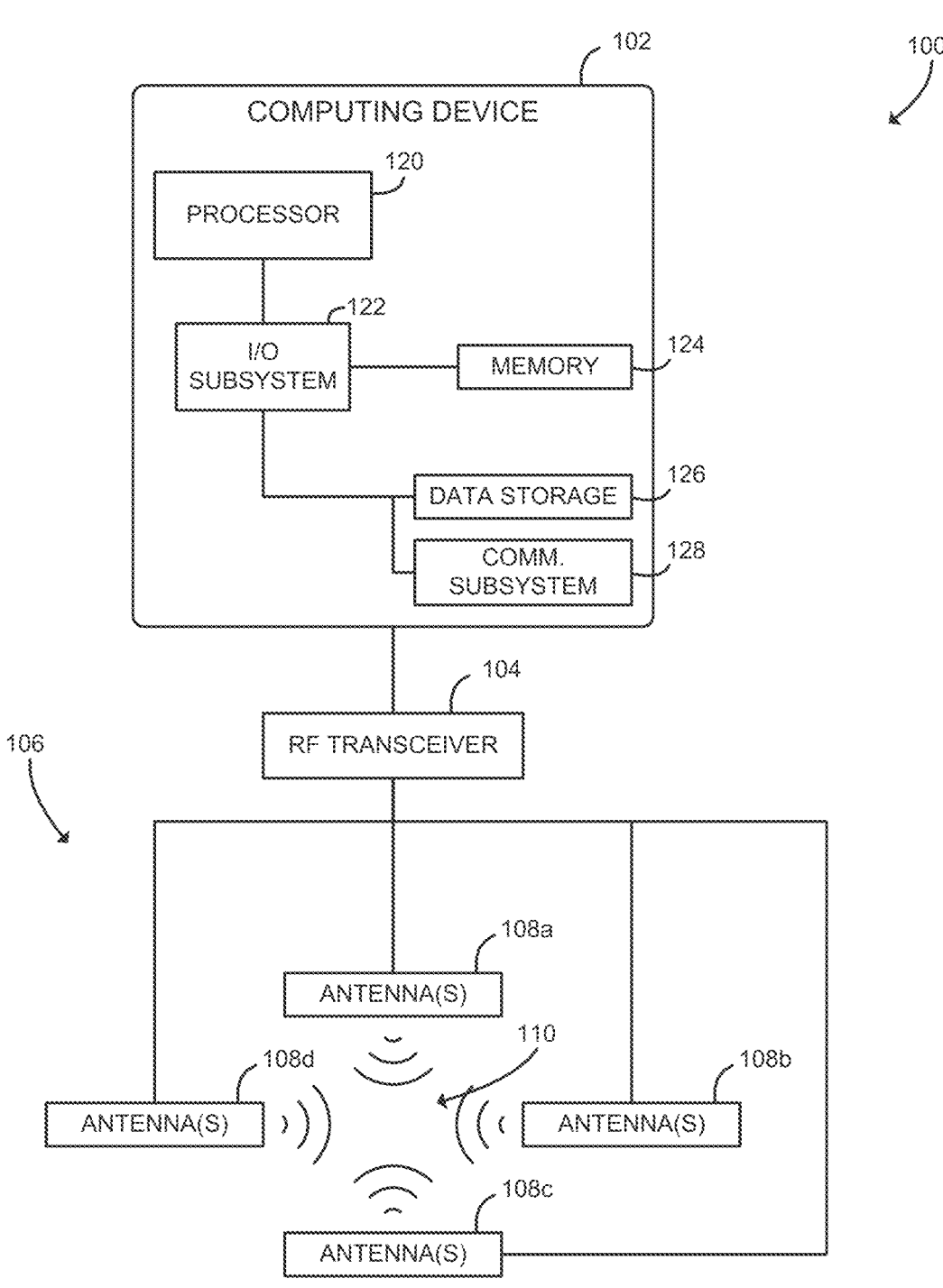
FIG. 1 is a simplified block diagram of at least one embodiment of a system for non-contact gesture recognition with radiomyography sensors.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an example illustrative system 100 for non-contact gesture recognition with radiomyography sensors includes remote browsing includes a computing device 102 coupled to a radio frequency (RF) transceiver 104 and a radiomyography (RMG) sensor device 106. In use, the sensor device 106 is positioned near (but not necessarily in contact with) a body part of a user, such as the user's forearm. The computing device 102, using the RF transceiver 104, transmits RF signals with the sensor device 106, and the near field of those RF signals couple with the user's body. The signals are modulated by muscle activity (e.g., contraction and/or relaxation) within the user's body, which correspond to gestures and other movements (e.g. voluntary body movements and/or involuntary body movements) made by the user. For example, muscle activity in the user's forearm may correspond to finger and hand motions made by the user. Continuing that example, the sensor device 106 may be positioned on the user's forearm, within 0-10 cm of the user's forearm, or otherwise within near-field distanced of the user's forearm. The computing device 102 receives signals from the sensor device 106 using the RF transceiver 104 and classifies those signals with a trained machine learning model to generate a gesture classification. The gesture classification may be used, for example, as input to a human-computer interface (HCI) or otherwise processed by the computing device 102.

In some aspects, the RMG sensing performed by the system 100 may be touchless and non-invasive, distinguishing superficial and deep muscle groups with less ambiguity and interference and ultra-low latency as compared to conventional sEMG. Further, by using touchless sensing, the system 100 does not require direct skin contact with electrodes or other sensors, and thus may improve user comfort as compared to conventional sEMG or motion-based sensors that rely on accelerometers and gyroscopes directly attached to the moving fingers and hands. Additionally or alternatively, in some embodiments the system 100 may perform RMG sensing with the sensor device 106 in contact with the user's body, incorporated in clothing, and/or with a combination of contact and non-contact sensing. Further, motion-based sensors may only transduce surface motion, and may not sense deep muscle activities. As compared to certain vision-based or radar-based gesture recognition systems, the system 100 does not require off-body line-of-sight (LoS) and is thus less vulnerable to obstruction from self and ambient occlusion. Further, in an experiment, the system 100 was configured to recognize 23 gestures with average accuracy up to 99% on 8 participants, as compared to most present HGR systems that may only distinguish less than 10 hand gestures. Further, as described further below, by transfer learning, the system 100 may demonstrate high adaptivity to user difference and sensor variation, illustratively achieving average accuracy up to 97%.

The computing device 102 may be embodied as any type of device capable of performing the functions described herein. For example, the computing device 102 may be embodied as, without limitation, a desktop computer, a laptop computer, a tablet computer, a wearable computer, a smartphone, a consumer electronic device, a workstation, a server, a rack-mounted server, a blade server, a network appliance, a web appliance, a distributed computing system, a multiprocessor system, and/or any other computing device capable of performing the functions described herein. As shown in FIG. 1, the illustrative computing device 102 includes a processor 120, an I/O subsystem 122, memory 124, a data storage device 126, and communication circuitry 128. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any communication circuit, device, or collection thereof, capable of enabling communications between the computing device 102 and other remote devices. The communication circuitry 128 may be configured to use any one or more communication technology (e.g., wireless or wired communications) and associated protocols (e.g., Ethernet, Bluetooth®, Wi-Fi®, WiMAX, etc.) to effect such communication.

Similarly, the RF transceiver 104 may be embodied as any type of device capable of performing the functions described herein. For example, the RF transceiver 104 may be embodied as one or more software defined radios (SDRs), radio front ends, or other radio transmission and/or reception circuitry. In an illustrative embodiment, the RF transceiver 104 is two software defined radios (SDR, National Instrument Ettus Research B210), denoted as SDR1 and SDR2. The two SDRs are synchronized by an external local oscillator (LO, BG7TBL-GPSDO) with 10 MHz reference and 1 PPS (pulse per second) baseband synchronization. The SDRs may be connected to the computing device 102 through universal serial bus (USB) or another such I/O connection. Additionally or alternatively, although illustrated as a separate component, it should be understood that in some embodiments the RF transceiver 104 may be incorporated into the computing device 102 and/or the sensor device 106. Additionally, in some examples, separate transmitters and receivers may be used in lieu of one or more (integrated) RF transceivers 104.

The sensor device 106 may be embodied as a device or collection of devices that includes multiple antennas 108 surrounding a user volume 110. As described further below, the user places a forearm or other body part within the user volume 110. Each of the antennas 108 may be embodied as a monopole whip antenna, a coaxial cable notch antenna, or other antenna device capable of transmitting and/or receiving RF signals. Illustratively, the sensor device 106 includes four antennas 108a, 108b, 108c, 108d, although in other embodiments the sensor device 106 may include a different number of antennas (e.g., one antenna, two antennas, three antennas, or more than four antennas). In some embodiments, the sensor device 106 includes multiple pairs of antennas 108, with each pair of antennas 108 include a transmit (Tx) antenna and a receive (Rx) antenna. Illustrative embodiments of sensor devices 106 are illustrated in FIGS. 7-10 and described further below.

Figure 2:
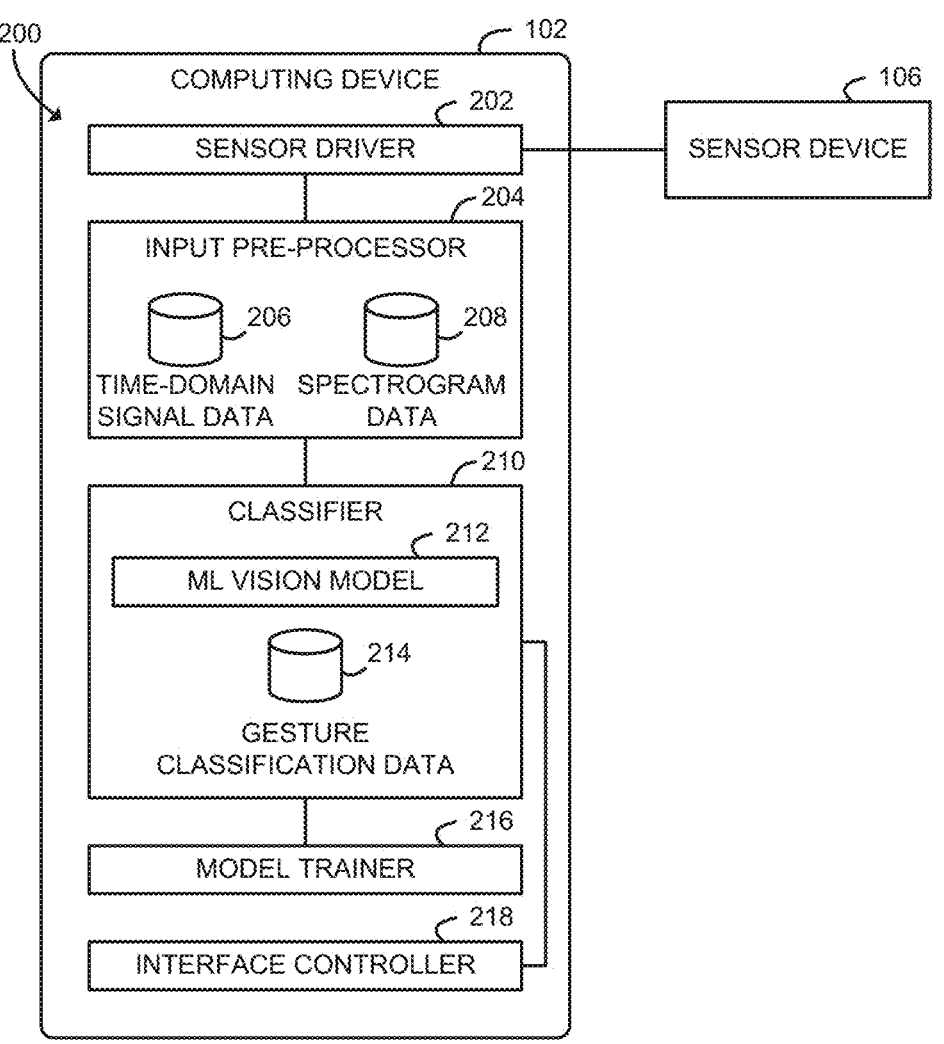
FIG. 2 is a simplified block diagram of an environment that may be established by a computing device of the system of FIG. 1.

Referring now to FIG. 2, in the illustrative embodiment, the computing device 102 establishes an environment 200 during operation. The illustrative environment 200 includes a sensor driver 202, an input pre-processor 204, a classifier 210, a model trainer 216, and an interface controller 218. The various components of the environment 200 may be embodied as hardware, firmware, software, or a combination thereof. As such, in some embodiments, one or more of the components of the environment 200 may be embodied as circuitry or a collection of electrical devices (e.g., sensor driver circuitry 202, input pre-processor circuitry 204, classifier circuitry 210, model trainer circuitry 216, and/or interface controller circuitry 218). It should be appreciated that, in such embodiments, one or more of those components may form a portion of the processor 120, the I/O subsystem 122, and/or other components of the computing device 102.

Figures 7, 8, 9:
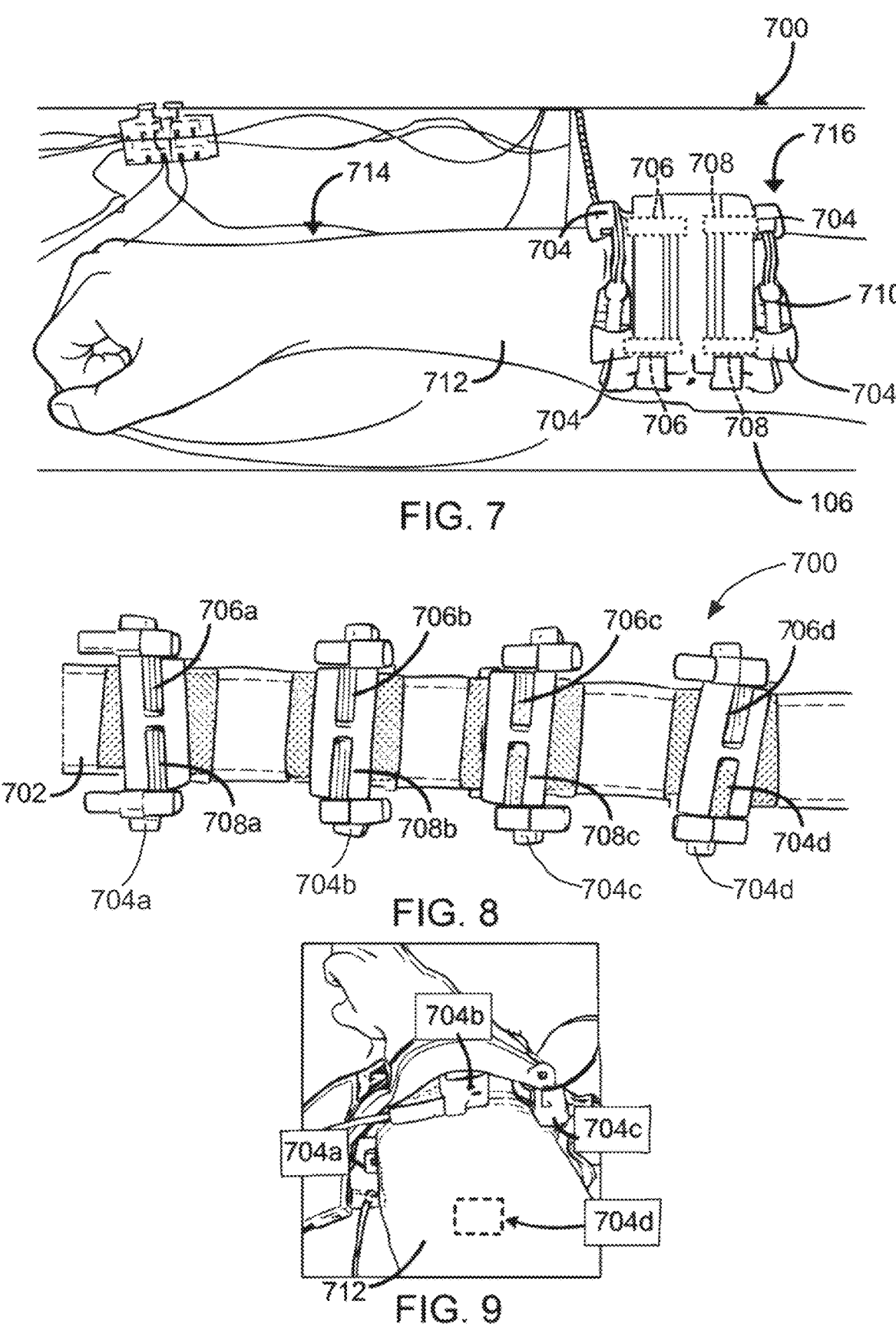
FIGS. 7-9 are perspective diagrams of at least one embodiment of a radiomyography sensor device for non-contact hand gesture recognition.
Figure 10:
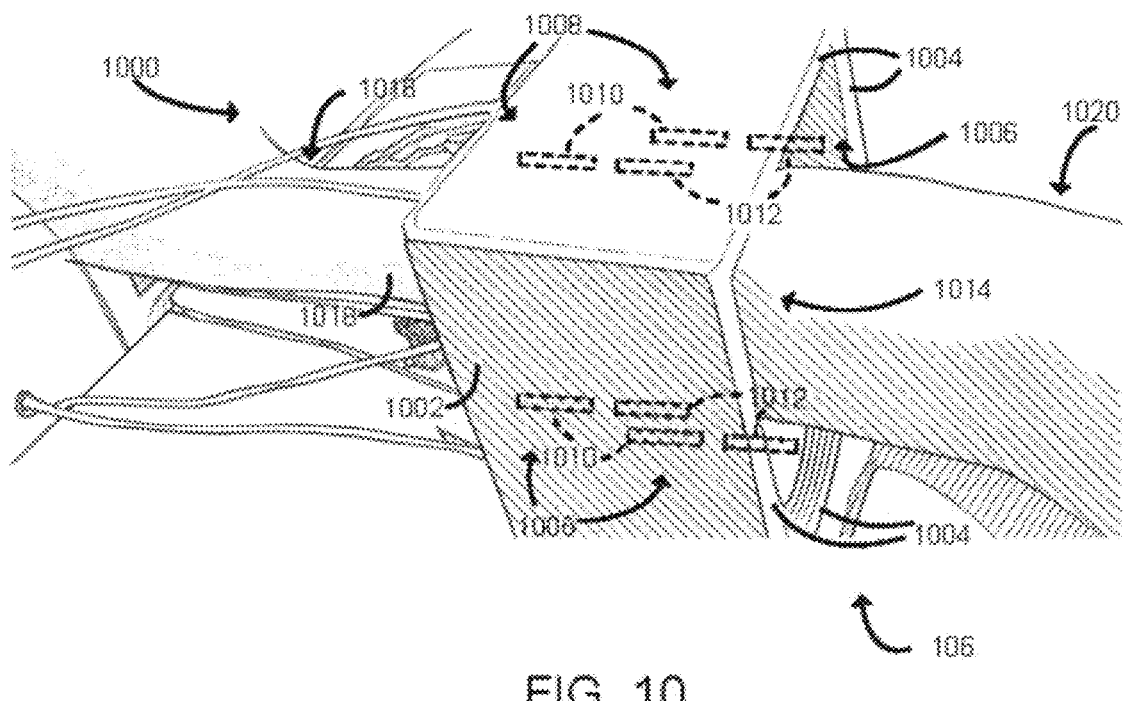
FIG. 10 is perspective diagram of at least one other embodiment of a radiomyography sensor device for non-contact hand gesture recognition.

The sensor driver 202 is configured to transmit multiple radio frequency (RF) sensor signals with transmit antennas 108 of the sensor device 106, and to receive multiple time-domain signals with the receive antennas 108 of the sensor device 106. A near field of the RF sensor signals couples with a body of the user. For example, in some embodiments, the sensor device 106 may be positioned near an arm of the user when transmitting and receiving, and the near field of the RF sensor signals couples with the arm. As described further below, in some embodiments the antennas 106, 108 may be coupled to or otherwise incorporated with a device that positions and orients the antennas 106, 108 in a predetermined orientation and/or position relative to the body of the user. For example, in an embodiment the antennas 106, 108 may be coupled to a cuff that may be worn on the user's forearm as shown in FIGS. 7-9 or to a frame that may receive the user's forearm as shown in FIG. 10. Receiving the time-domain signals may include receiving near-field coherent sensing signals. The RF sensor signals may have a carrier frequency of about 900 MHz, about 1.8 GHz, or between about 900 MHz and 1.8 GHz. Transmitting the RF sensor signals may include multiplexing the RF sensor signals, for example with frequency-division multiplexing or code-division multiplexing. In some embodiments, the sensor driver 202 is further configured to demultiplex the time-domain signals into multiple demultiplexed time-domain signals. Each of the demultiplexed time-domain signals is associated with a pairing of a transmit antenna 108 and a receive antenna 108.

The input pre-processor 204 is configured to generate multiple augmented time-domain signals based on the time-domain signals (including demultiplexed time-domain signals). Generating the augmented time-domain signals may include generating a phase time domain signal an amplitude time domain signal, and/or a complex number signal for each demultiplexed time-domain signal. The input pre-processor 204 is further configured to generate pre-processed time-domain signals by pre-processing the augmented time-domain signals. Pre-processing the augmented time-domain signals may include segmenting the augmented time-domain signals to isolate a gesture, filtering the augmented time-domain signals with a bandpass filter, normalizing the augmented time-domain signals, and/or detrending the augmented time-domain signals by subtracting a linear best fit line from each augmented time-domain signal. The bandpass filter may have a pass band between about 0.1 Hz to 5 Hz. In some embodiments, the input pre-processor 204 is configured to combine the plurality of time-domain signals with sensor data received from a surface electromyography sensor. The time-domain signals, the demultiplexed time-domain signals, the augmented time-domain signals, and/or the pre-processed time domain signals may be stored in the time-domain signal data 206.

The input pre-processor 204 may be further configured to transform each of the time-domain signals (i.e., the time-domain signal data 206) to one or more two-dimensional spectrograms, which may be stored in spectrogram data 208. Transforming each of the time-domain signals to one or more two-dimensional spectrograms may include performing one or more short-time Fourier transforms, each having a different window length. For example, in an embodiment a first window length is about 0.6 s and a second window length is about 1.0 s. In some embodiments, transforming each of the time-domain signals to one or more two-dimensional spectrograms may include performing one or more continuous wavelet transforms, each with a different, predetermined mother wavelet, such as a Ricker wavelet, a Gaussian wavelet, and a Morelet wavelet.

The classifier 210 is configured to classify the time-domain signals with a trained machine learning model 212 to generate a gesture classification 214. The trained machine learning model 212 comprises a deep neural network, such as a convolutional neural network, a vision transformer model, or other ML vision model 212. In some embodiments, the classifier 210 may be configured to classify the two-dimensional spectrograms 208 with the trained machine learning model 212 to generate the gesture classification 214. The gesture classification 214 may comprise, for example, classifications of a plurality of gestures involving one or more limbs (e.g., one arm, two arms) and/or one or more portions of one or more limbs such as hand gesture classification comprising muscle activity (e.g., change in state of tissue corresponding to contraction and/or relaxation) involving one or more segments of one or more fingers, the wrist and/or the forearm. While gesture classification 214 is described herein in relation to a particular example of the present concepts, the disclosed concepts are not limited to gesture classification. The present concepts are to be understood to more broadly include an event classifier of a trained system, as to a user or to a population of users having similitude, wherein a plurality of selected user physiological inputs are correlated to a corresponding plurality of discrete events that are related to defined meanings. For instance, the user physiological inputs could include, but are not limited to, contraction of a muscle or group(s) of muscles in isolation or in a particular sequence, relaxation of a muscle or group(s) of muscles in isolation or in a particular sequence, a combination of contraction of a first muscle or first group(s) of muscles in isolation or in a particular sequence and a corresponding relaxation of a second muscle or second group(s) of muscles in isolation or in a particular sequence, optionally including a magnitude or degree of the contraction and/or relaxation, or range of magnitude, and/or a duration of the contraction and/or relaxation, or range of duration, etc. While certain contraction(s) and/or relaxation (s) may be functionally associated with certain meanings selected by a user, other contraction(s) and/or relaxation(s) may be functionally associated with a user's physiological state. For instance, the event classification could comprise one or more first state(s) of contraction(s) and/or relaxation (s) for a specified muscle or group(s) of muscles as a baseline, with one or more second state(s) of contraction(s) and/or relaxation(s) for the specified muscle or group(s) of muscles as a departure from the baseline with corresponding meaning(s) for the change of state from the first state to the second state being attributed in the event classifier. As another example, the event classification could comprise one or more predefined relationships between one or more first state(s) of contraction(s) and/or relaxation(s) for a specified first muscle or first group(s) of muscles on a first side a user's body and one or more second state(s) of contraction (s) and/or relaxation(s) for a second muscle or second group(s) of muscles that may correspond to the first muscle or first group(s) of muscles (e.g., same muscles on an opposite side of the user's body) or that may be different muscle(s) than the first muscle or first group(s) of muscles (e.g., compensating muscle movements for balance while stationary or while moving, etc.).

The model trainer 216 is configured to perform transfer learning on the trained machine learning model 212 with a calibration data set. In some embodiments, the model trainer 216 is further configured to generate the calibration data set by labeling the time-domain signals 206 with one or more predetermined gesture classifications. In some embodiments, the model trainer 216 is further configured to determine whether a new user is associated with the sensor device 106 or a new orientation is associated with the sensor device 106 and, if so, to perform the transfer learning. The time-domain signals may be classified after performing the transfer learning. The interface controller 218 is configured to use the gesture classification as an input to a human-computer interface.

Referring now to FIG. 3, in use, a computing device 102 may execute a method 300 for non-contact gesture recognition. It should be appreciated that, in some embodiments, the operations of the method 300 may be performed by one or more components of the environment 200 of the computing device 102 as shown in FIG. 2. The method 300 begins with block 302, in which the computing device 102 generates ultra high frequency (UHF) radio frequency (RF) signals with multiple transmit antennas 108 of the sensor device 106. Such RF signals in the UHF band, especially in the near-field region, will penetrate most dielectrics effectively without requiring direct skin contact. Thus, in some examples, the system 100 (including antennas 108) may be deployed over clothing or outside a forearm band, or in some embodiments may be embedded in a nearby apparatus such as armrests and wrist pads. Of course, in some embodiments, the part or all of the system 100 (e.g., the antennas 106, 108) may be in contact with the user's skin. In some embodiments, in block 304 the computing device 102 may generate multiple multiplexed signals, for example with one multiplexed signal per transmitter. In an embodiment, the digital baseband for each transmitter (Tx) may pass through a digital-to-analog converter (DAC) and then be mixed with the carrier frequency fRF. The transmit and receive antenna

108 pair may operate around 900 MHz and 1.8 GHz. Lower frequencies may provide stronger penetration into the human body and better signal coupling. Thus, in an embodiment fRF was selected at 900 MHz. The multiple Tx channels may use frequency-division multiple access (FDMA) by setting fBB=10, 25, 40, and 125 kHz, respectively, for four transmission channels Tx1☐Tx4. The RF power may be less than 10 dBm or 0.1 mW, which is well under safety limits such as those set by the Occupational Safety and Health Administration (OSHA) in the UHF band.

In block 306, the computing device 102 receives time-domain signals 206 for user muscle activity with the receive antennas 108 of the sensor device 106. In some embodiments, in block 308 the computing device 102 receives near-field coherent sensing signals from a non-contact sensor. From near-field EM coupling, near-field coherent sensing may directly modulate muscle motion on the surface and inside the user's body onto multiplexed radio signals. For RMG, in the near-field region of the forearm, the dielectric change of the internal muscle groups during the manipulation of hand gestures may be represented as the RF channel characteristics in a non-invasive manner. Owing to the high penetration capability of UHF, the system 100 may monitor all muscle groups in the forearm including both superficial and deep layers. Meanwhile, due to its touchless operation over clothing, the system 100 may have more design freedom for various application scenarios.

In some embodiments, in block 310 the computing device 102 generates $N^2$ channels of time-domain signals from N antenna pairs. For example, for four transmit/receive antenna pairs the computing device 102 may generate sixteen channels. Each channel may be identified by demultiplexing the sensing signal received by each receiver antenna. Illustratively, the system 100 uses multiple-input multiple-output (MIMO) near-field coherent sensing (NCS) radio signals to measure the change of dielectric properties and dielectric boundary in forearm muscles during dynamic hand gestures. Near-field coherent sensing couples UHF electromagnetic (EM) waves inside the body and reads out the internal organ and tissue signals as modulated antenna characteristics or scattering impedance matrices. MIMO explores $N^2$ coupling paths or channels from N sensing units to enhance the spatial diversity of 3D observation.

As described above, MIMO may be used to incorporate $N^2$ usable channels from N observation points. MIMO is an RF technique where different transmitters (Tx) may be well isolated by either frequency or code multiplexing. Similar techniques may be employed by colors in vision and sub-carriers in ultrasound, but RF MIMO offers higher channel isolation than optical or acoustic waves with much lower cost. N transmitters (Tx1 to TxN) may then be simultaneously received and demodulated by N receivers (Rx1 to RxN) to accomplish $N^2$ synchronous channels to fulfill the spatial diversity in observation of complex 3D geometry and motion. Due to tissue dispersion and near-field nonlinearity, the channel by Tx1-Rx2 would collect different information from Tx2Rx1.

In an embodiment, the Tx signal may be coupled into the forearm muscle groups, received by all Rx, and then demodulated and sampled by an analog-to-digital converter (ADC) to retrieve the baseband. The quadrature scheme may be used as the baseband tone fBB, and the near-field coherent sensing signal may be represented by the amplitude and phase modulation on the quadrature signal as $$NCS_{am}(t) = \sqrt{I_{Rx}(t)^2 + Q_{Rx}(t)^2} \tag{1}$$

$$NCS_{ph}(t) = \text{unwrap}\left(\tan^{-1}\frac{Q_{Rx}(t)}{I_{Rx}(t)} - 2\pi f_{BB} - \theta_0\right) \tag{2}$$

$$I_{Rx}(t) = A(t)\cos(2\pi f_{BB}t + \theta_0) \tag{3}$$

$$Q_{Rx}(t) = A(t)\sin(2\pi f_{BB}t + \theta_0) \tag{4}$$

where $\theta_0$ is the phase offset accumulated from the Tx☐Rx signal chain and may not be constant among different channels or setups. In the illustrative embodiment, the dual SDR were configured as 4 self-channels and 12 cross channels. For example, Tx1 may be received by Rx1 as self backscattering, which was most affected by the muscle changes around Unit 1 to detect the extension and flexion of the thumb. Tx1 may also be received by Rx2-Rx4 as cross channels to collect information on the path. All 16 channels may be sampled at 106 samples per second (Sps) to implement Tx FDMA, and may be further down-sampled to 500 Sps to retrieve NCS magnitude and phase.

In block 312, the computing device 102 recognizes one or more gestures performed by the user based on the time-domain signals. Illustratively, the recognized gesture may be selected from one or more predetermined hand gestures. In an illustrative embodiment, the ML model was trained to recognize a set of twenty-three gestures, including finger, palm, and wrist motions with various speeds and multiple degrees of freedom (DOFs), as described below in Table 1. The illustrative embodiment includes 8 dynamic basic gestures and 1 static resting gesture. Basic gestures are extended to three versions including: 1) quick, 2) double quick, and 3) slow, except that the gesture "Fist" may only have the slow version. Every gesture may be performed in a fixed time window (e.g., 5 s), and for training purposes may be performed following a voice command. All gestures excluding "Rest" are dynamic and include two steps (e.g., extend certain digits or wrist and then flex those digits or writs). For the quick version of each gesture, the second step is performed immediately after the first step, while the slow version has a holding time (e.g., about 2 s) between both steps. For each dynamic gesture, after the second step, the hand relaxes back to the "Rest" gesture. On-off timing for each gesture motion inside the time window may not be fixed due to subject difference and variation in the response time for different repetitions. Additionally or alternatively, the computing device 102 may recognize different numbers and/or types of gestures. For example, in an embodiment, the computing device 102 may recognize gestures, such as letters or numbers "drawn" by the user in space with his or her hand. As another embodiment, the computing device 102 may recognize eye movements, leg movement, or any other body movement or muscle activity sensed by the sensor device 106 either in isolation or in combination with one or more other sensing devices (e.g., accelerometer(s), gyroscope(s), inertial measurement unit(s), angle sensor(s), etc.) borne by the user.

TABLE 1

| Illustrative gestures that may be recognized. | | | |
|---|---|---|---|
| Gesture | Quick | Quick Double | Slow |
| Point Thumb | P1 | P1x2 | sP1 |
| Point Index | P2 | P2x2 | sP2 |
| Point Ind. + Mid. | P23 | P23x2 | sP23 |

TABLE 1-continued

Illustrative gestures that may be recognized.

| Gesture | Quick | Quick Double | Slow |
|---------|-------|--------------|------|
| Point 4 Fingers | P4 | P4x2 | sP4 |
| Grasp | G | Gx2 | sG |
| Wrist Up | U | Ux2 | sU |
| Wrist Down | D | Dx2 | xD |
| Fist | | | sF |
| Rest | | | R |

In some embodiments, the device, system, or method can be configured to identify voluntary movements (e.g., gestures) with a desired degree of accuracy (e.g., 95%, 96%, 97%, 98%, or 99% accuracy). In other embodiments, the device, system, or method can be used to identify involuntary body movements (e.g., tremor, tic, spasm, cramp, pulse, etc.), either alone or in combination with voluntary movements. Identification and classification of voluntary and/or involuntary body movement(s) may advantageously assist with diagnosis of, monitoring of a progression of, and/or monitoring of an effectiveness of a therapeutic treatment of one or more diseases associated with musculature (e.g., Parkinsons, epilepsy, Huntington's disease, a movement disorder, etc.). In some embodiments, the device, system, or method is configured to classify and/or identify not only voluntary movements (e.g., gestures, etc.) and involuntary movements of soft tissue (e.g., muscles, fat, blood vessels, nerves, tendons, fascia, etc.), but is also or alternatively configurable to classify and/or identify periodic movements of soft tissue, inclusive of transitions of such periodic movements between a plurality of different periodic states (e.g., increasing or decreasing period within one or more ranges of periodicity and/or increasing or decreasing magnitude within one or more ranges of magnitude, etc.). As previously noted, the event classifier can be configured to track one or more selected states to facilitate identification of trends and/or changes in time for one or more selected states.

As another example, the device, system, or method can identify air-writing gestures. Air-writing is the writing of linguistic characters or words in free space by hand or finger movements. For example, a user may point an index and middle finger with assistive wrist motion to form letter shapes in air. Each letter shape may be associated with a predetermined stroke sequence (e.g., a predetermined sequence of lines, curves, and/or other shapes that form a particular letter of an alphabet). In an embodiment, the device, system, or method may classify letters input by the user. For example, the device, system, or method may classify time-domain signal data (e.g., 16 channels of time-domain data including amplitude and phase information) into 26 classes, each corresponding to a letter in the English alphabet. As air-writing signals are non-periodic and fast transient, continuous wavelet transform (CWT) with the Morelet mother wavelet may be used, and letter classification accuracy may improve for fast air-writing gestures as compared to slower writing speeds. CWT analysis is described further below. Air-writing letter classification accuracy for a model trained on multiple users may also be improved by transfer learning, as described further below. In addition to letter-shape-specific data, the time-domain signal data also includes user-specific data—that is, each particular user may perform air-writing gestures with different timing or otherwise perform the gestures differently. Accordingly, in some embodiments, the device, system, or method may identify a particular user based on the time-domain signal data. For example, a CNN model may be trained for user recognition using individual letters, and then major voting may be used to decide on the letter. For each individual, letter classification accuracy is high (e.g., 89-99%), and with major voting user identification can be done with 99% accuracy.

The computing device 102 may recognize the gesture using a pre-trained machine learning model such as a convolutional neural network (CNN), a vision transformer model, or other deep learning model. In some embodiments, in block 314 the computing device 102 may pre-process the time-domain signals in order to augment, filter, normalize, transform, or otherwise generate input data or other input features for the model. In block 316, the computing device 102 classifies the pre-processed input data with the ML model. One potential embodiment of a method for pre-processing and classifying input data is described below in connection with FIG. 4.

In block 318, after classifying the gesture, the computing device 102 performs one or more operations based on the recognized gesture. In some embodiments, the computing device 102 may activate a user interface function or other human-computer interface (HCI) function based on the recognized gesture. For example, gesture recognition for HCI control may be applied to various applications including 3D virtual reality control; sign-language detection for hard of hearing persons; assistive robotic control; communication in hostile environment such as fire and covert operations; non-contact navigation and infotainment in smart cars; or other HCI applications. In some embodiments, in block 322 the computing device 102 may compare the recognized gesture and/or the associated sensor signals or other input data to electromyography (EMG) sensor data that is captured or otherwise received by the computing device 102. Illustrative EMG sensor data combined with RMG sensor data are described below in connection with FIG. 11. After performing the operation, the method 300 loops back to block 302 to continue generating RF sensor signals and recognizing gestures.

Referring now to FIG. 4, in use, a computing device 102 may execute a method 400 for signal pre-processing and ensemble data classification. It should be appreciated that, in some embodiments, the operations of the method 400 may be performed by one or more components of the environment 200 of the computing device 102 as shown in FIG. 2. The method 400 begins with block 402, in which the computing device 102 augments the time-domain signals received with the sensor device 106 with one or more additional signals. In some embodiments, in block 404 the computing device 102 determines a phase signal for each time-domain signal. In some embodiments, in block 406 the computing device 102 determines an amplitude signal for each time-domain signal. In some embodiments, in block 408 the computing device 102 determines a complex number representation for each time-domain signal. For example, for the illustrative MIMO configuration for the system 100 including four antenna pairs, 16 channels by 4 RF sensing antenna pairs on a forearm may be obtained. As shown in Equations (1) and (2), above, each channel contains phase NCSph(t) and amplitude NCSam(t) in the quadrature scheme on fBB. In addition to employing phase and amplitude, the original complex number may be kept as part of the information to retain the intricate relation between NCSam(t) and NCSph(t). Thus, for each of the 16 physical channels, there may be three signal representations: phase, amplitude, and complex number to make up 48 time series in total for the augmented time-domain signals.

In block 410, the computing device 102 pre-processes the augmented time-domain signals. In some embodiments, in block 412 the computing device 102 segments or otherwise isolates one or more gestures within the time-domain signals. The computing device 102 may segment time-domain signals into individual windows of a predetermined length associated with the gestures in use (e.g., 5 s or another time). In some embodiments, the computing device 102 may dynamically segment the time-domain signals into individual windows each containing a gesture. In some embodiments, in block 414 the computing device 102 filters the time-domain signals with a bandpass filter. In an embodiment, the pass band may be between 0.1 Hz to 5 Hz. In some embodiments, in block 416 the computing device 102 normalizes the time-domain signals. The normalized time-domain signals may have a center at 0 and a standard deviation of 1. In some embodiments, the computing device 102 de-trends the time-domain signals using a linear best-fit. The computing device 102 may, for example, subtract a linear best-fit line from the time-domain signal.

In block 420, the computing device 102 transforms the time-domain sensor data into one or more two-dimensional spectrograms. The computing device 102 may use multiple different transformation methods and/or parameters in order to generate an ensemble of multiple spectrograms. In some embodiments, in block 422, the computing device 102 may perform short-time Fourier transform (STFT). The computing device 102 may perform multiple STFT operations with different window lengths. By using different window lengths, information with different resolutions in time and frequency may be acquired. In some embodiments, in block 424 the computing device 102 performs continuous wavelet transform (CWT). In CWT, a signal is convolved with a set of wavelets at different scales and positions. The original wavelet which is scaled and shifted is called the "mother wavelet," and different mother wavelets may capture different patterns in the signal. The computing device 102 may perform multiple CWT transformations using multiple different mother wavelets, such as Ricker, Gaussian, and Morelet wavelets.

Figure 5:
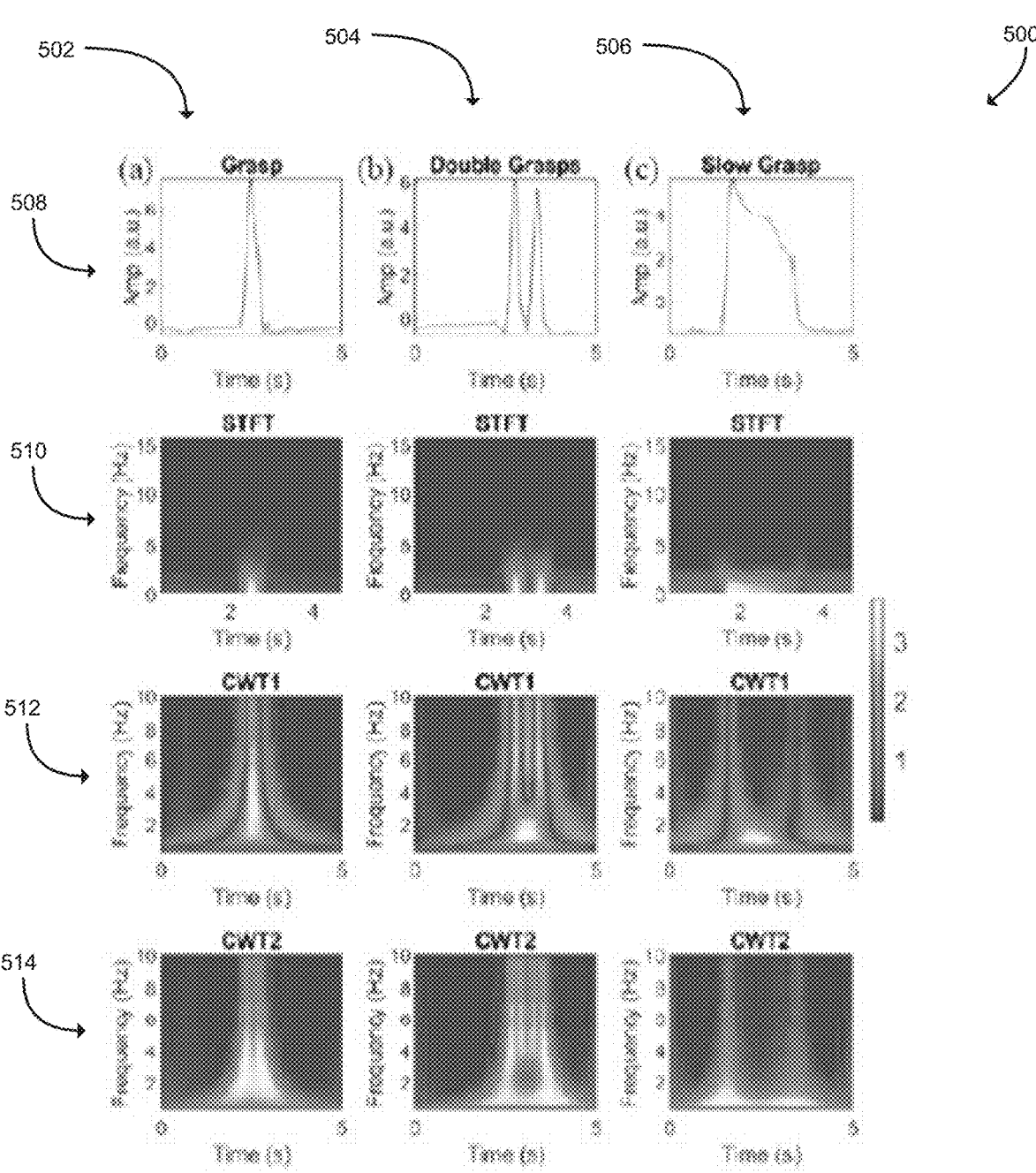
FIG. 5 is a diagram of illustrative pre-processed ensemble data that may be used with the method of FIG. 4.

Referring now to FIG. 5, schematic diagram 500 illustrates sample data that may be processed by the computing device 102. Each chart in column 502 shows data associated with a grasp gesture, each chart in column 504 shows data associated with a double grasp gesture, and each chart in column 506 is associated with a slow grasp gesture. Each chart in row 508 represents time-domain sensor data captured by the computing device 102 from the sensor device 106. Each chart in row 510 represents a two-dimensional spectrogram generated from the corresponding time-domain signal using STFT with a 0.6 s time window. Each chart in row 512 represents a two-dimensional spectrogram generated from the corresponding time-domain signal using CWT with a Ricker wavelet. Each chart in row 514 represents a two-dimensional spectrogram generated from the corresponding time-domain signal using CWT with a Gaussian wavelet.

Referring back to FIG. 4, after generating the two-dimensional spectrograms, in block 426, the computing device 102 classifies the spectrogram ensemble data with the trained machine learning model 212 and generates gesture classifications. As the spectrograms include time-frequency features with high resolution and may be represented as image-like two-dimensional data, the trained machine learning model 212 may be a vision-based classifier. In some embodiments, in block 428 the computing device 102 may classify the spectrogram data with a convolutional neural network (CNN). In an illustrative embodiment, the CNN may include four 2D convolution layers, each followed by a BatchNorm layer, and 2 linear layers after the convolution layers. Classifying with such a CNN may provide high efficiency and high recognition accuracy. For example, in an experiment, gesture recognition accuracy using CNN classification had an error rate of 5% (i.e., 95% accuracy). In some embodiments, in block 430 the computing device 102 may classify the spectrogram data with a vision transformer (ViT) model. The ViT model has a deep-learning architecture inherited from the transformer model used in natural language processing. Using ViT may improve accuracy and efficiency as compared to using a CNN. For example, in an experiment, the gesture recognition error rate dropped from 5% for CNN recognition to 1% for ViT (i.e., 99% accuracy). In some embodiments, the particular machine learning model used may depend on desired accuracy, performance efficiency, or other factors. For example, as described above the ViT model may provide higher accuracy than the CNN model, but the CNN model may be computationally less demanding or otherwise more efficient to execute. In some embodiments, for example with air-writing gesture recognition as described above, the CNN model may have a sufficiently high accuracy (e.g., 95% as compared to 96% for ViT) and may be selected for its computational efficiency.

In an illustrative embodiment, over the ViT architecture, patches of the 2D input image are constructed from the time-frequency spectrogram. The image is split into fixed-size patches (size=5), each of which are then linearly embedded (dimension=512). Position embedding is added, and the resulting vector sequences are fed to a transformer encoder. Inside the encoder, there are 6 transformer blocks, 16 heads in the multi-head attention layer, 64 dimensions of the multi-layer perceptron (MLP) (feed-forward) layer, and the dropout rate is set to 0.1. Both the ViT and the CNN models may be optimized with the Adam optimizer.

Accordingly, the system 100 can be configured to recognize a large number of gestures with a high degree of accuracy. For example, in an experiment performed with the illustrative embodiment, the system 100 may achieve high accuracy (99%) for 23 gestures trained on 8 participants. This compares favorably to other HGR systems, which may only be able to distinguish fewer than 10 hand gestures. In the illustrative embodiment, the system 100 achieved an overall accuracy of 99.0% for 23 gestures in total, which employed the ensemble data processing method by majority voting of all feature sets including multiple STFT feature sets (STFT1 and STFT2) and multiple CWT features sets (CWT1, CWT2, and CWT3). Compared to using the feature sets separately, the ensemble method with the flexibility to choose among all alternatives achieved the highest accuracy. STFT2 used a longer time window length and thus had a higher frequency resolution and accuracy than STFT1. CWT features generally outperformed STFT. CWT3 by Morelet wavelet achieved the highest accuracy of 98.6% among all individual feature sets. In a further experiment, recognition accuracy was also tested using only self-backscattering channels as the input for the ViT model (e.g., Tx1-Rx1, Tx2-Rx2, etc.). Accuracy for only self-backscattering channels was 95.0% by 7-fold cross validation. Similarly, accuracy may decrease when the number of sensing antenna pairs is decreased to 3, and in other embodiments, 5 or more sensing antenna pairs may be used for measuring more gestures with higher accuracy. Thus, depending on a desired accuracy level for a particular plurality of states to be sensed by the system, a number of sensing antennas may optionally be adjusted accordingly.

When ViT recognition is compared to CNN recognition, the error rate dropped from 3.0% in CNN to 1.0% in ViT for 7-fold cross validation, and from 5.4% in CNN to 2.0% in ViT for routine-independent 7-fold cross validation. In some embodiments, a CNN may be trained to perform classification based on time-domain waveforms directly. Compared to such a one-dimensional CNN model, accuracies calculated by the same cross validation process dropped from 97.0% in 2D CNN to 88.5% in 1D CNN for 7-fold, and similarly from 94.6% to 88.0% for routine-independent 7-fold.

After classifying the spectrogram data, the method 400 is completed. The computing device 102 may use the generated gesture classification to perform one or more operations such as an HCI function as described above.

Figure 6:
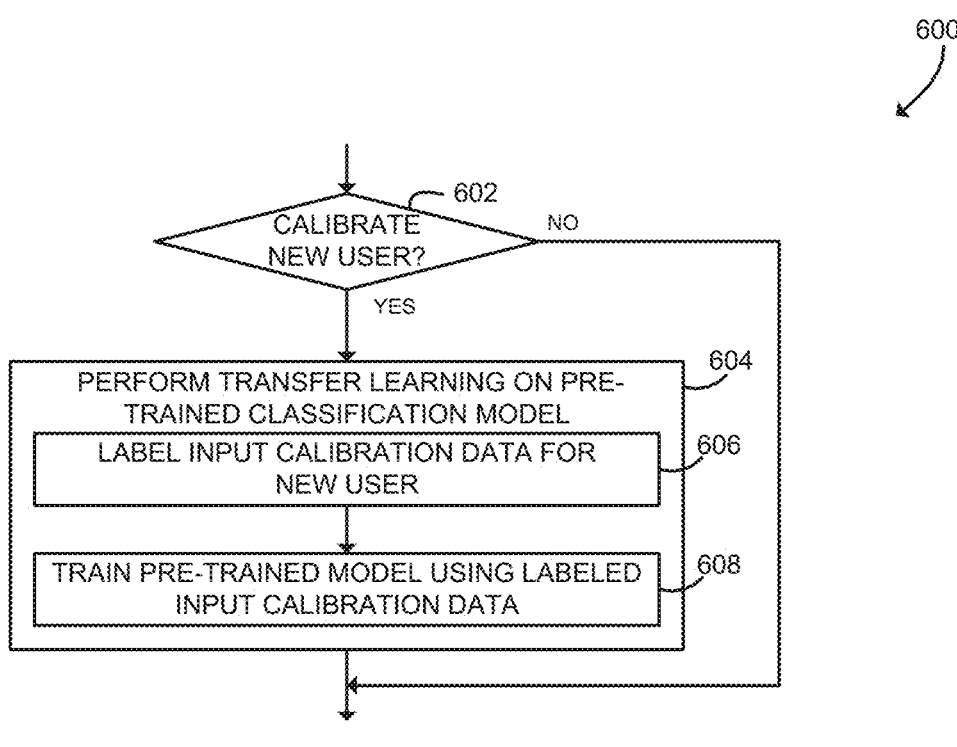
FIG. 6 is a simplified flow diagram of at least one embodiment of a method for transfer learning that may be executed by the computing device of FIGS. 1 and 2.

Referring now to FIG. 6, in use, a computing device 102 may execute a method 600 for transfer learning. It should be appreciated that, in some embodiments, the operations of the method 600 may be performed by one or more components of the environment 200 of the computing device 102 as shown in FIG. 2. The method 600 begins with block 602, in which the computing device 102 determines whether to calibrate operation for a new user. Additionally or alternatively, the computing device 102 may determine whether to perform calibration for an existing user where the sensor device 106 is worn in a different orientation or otherwise reconfigured. If the computing device 102 determines not to perform calibration, the method 600 is completed. The computing device 102 may perform recognition using the machine learning model 212 without transfer learning as described above in connection with FIGS. 3-4. If the computing device 102 determines to perform recognition, the method 600 advances to block 604.

In block 604, the computing device 102 performs transfer learning on the pre-trained classification model 212. In block 606, the computing device 102 labels input calibration data for the new user and/or the new orientation. The input calibration data may be embodied as time-domain signals and/or two-dimensional spectrogram data as described above, and may be labeled with one or more predetermined gestures, ground truth, or other label. In block 608, the computing device 102 trains the pre-trained model 212 using the labeled input calibration data. After performing transfer learning, the method 600 is completed. The computing device 102 may perform recognition using the machine learning model 212 after transfer learning as described above in connection with FIGS. 3-4. Accordingly, by performing transfer learning, the system 100 may achieve high adaptivity to user and/or sensor variations. By the transfer learning strategy, high accuracy (>97%) may be achieved for an unseen (new) user, for example by learning on ⅕ of new data and testing on the rest of the data (⅘). Variations in system 100 setups and/or configurations may also benefit from transfer learning. In an experiment, the pre-trained model was first generated using all data from 7 participants. Then, the model was fine-tuned with l/m data from a new participant as a short personal calibration process. The final model was tested on the rest (1☐l/m) data. This validation process is similar to k-fold, but only one fold is the training set, and (m☐l) folds are the testing sets. In this experiment, the averaged accuracy was 96.6%. Further, apart from subject variation, accuracy degradation may also be induced from sensor placement on the forearm. To test the adaptivity against sensor position variation, another test was performed on one participant with the same protocol but with the sensor position moved to a higher position (i.e., closer to the wrist) by d=3 cm. The same transfer learning strategy was used to achieve, by training on ⅕ of data on the new position, a high accuracy of 97.2% was obtained when testing on the rest ⅘. If performed without transfer learning, accuracy dropped to 87.2%.

Referring now to FIGS. 7-9, one illustrative embodiment 700 of a sensor device 106 is shown. The illustrative sensor device 700 includes a cuff 702 that is sized to be worn around a body part of the user, such as a user's forearm. As used herein, the term cuff is used to generally refer to any wearable such as, but not limited to, a cuff, sleeve, wrap, band, or strap. The cuff 702 may be formed from fabric or another flexible material, and may include hook-and-loop fasteners or other mechanical fasteners (e.g., ties, straps, elastic members, elastic material, etc.) to allow the cuff 702 to be secured to the user's arm. The cuff 702 is coupled to multiple antenna brackets 704, which are each configured to receive one or more antennas 108, cables, connectors, and/or other related components. Illustratively, the sensor device 700 includes four antenna brackets 704a-704d. In other examples, the sensor device 700 may include only two antenna brackets, three antenna brackets, or more than four antenna brackets. Each antenna bracket 704 is coupled to a corresponding transmit antenna 706 and receive antenna 708. Accordingly, in the illustrated example, the sensor device 700 includes four transmit antennas 706a-706d and four receive antennas 708a-708d. The illustrative antennas 706, 708 are each a monopole whip antenna. As shown, the antennas 706, 708 are elongated, and when the sensor device 700 is worn on the arm of the user, the antennas 706, 708 extend along the arm (i.e., parallel to a long axis of the arm). In some embodiments, one or more different types or arrangements of antennas 706, 708 may be used. For example, in some embodiments, each antenna 706, 708 may be a simple notch antenna formed from a notch in the shielding of a coaxial cable thereby allowing RF leakage. When the cuff 702 is closed together, the cuff 702 and thereby the antennas 706, 708 define and surround a user volume 710. In other examples, the antenna brackets are omitted and the transmit antenna and receive antenna are integrated into (e.g., embedded within, woven into, etc.) a wearable device.

As shown in FIGS. 7 and 9, the cuff 702 may be worn on the user's arm 712 between the user's wrist 714 and elbow 716. When so attached to the arm 712, muscles of the user's forearm are positioned within the user volume 710. Thus, in the illustrative embodiment, muscles of the mid-forearm used for hand motion may be positioned within the user volume 710. In some embodiments, the cuff 702 may be worn in a different position, such as closer to the user's wrist 714, for example similar to or as a part of a wristwatch, smart watch, or other wearable device.

For human and primates, fine motion of fingers and hands are derived from thenar, mid palmar, and hypothenar muscle groups. However, finger and wrist gestures, especially those with larger range and higher force, are actuated at the forearm by longus and brevis muscles in the anterior and posterior sides as well as the deep layers such as the flexor digitorum profundus and extensor indicis. In particular, muscles of the forearm may be approximately grouped into flexors (controlling flexion or bending gestures) in the anterior side, and extensors (controlling extension gestures) in the posterior side surrounding the radius and ulna bones. The anterior and posterior muscles may be further divided into superficial and deep layers. As described above, hand gestures by the superficial muscle layers may be captured by motion sensors like accelerometers with tight skin contact. However, deep-layer muscles are important for gesture recognition, but may raise ambiguity for surface-based sensors. For example, flexor digitorum profundus is the only major muscle that may flex the distal interphalangeal joints of the fingers, and four of deep posterior muscles are important for thumb and index finger movements. Hence, forearm muscle sensors for hand and wrist gestures may be able to differentiate hand gestures reliably only if all muscle groups, not just the surface ones, are included in the sensor readout.

Thus, when worn on the arm as described above, the sensor signals generated by the antennas 706 couple with muscles of the forearm, including deep muscle layers underneath other muscles. For example, in the illustrative embodiment, the antennas 706a, 708a may be positioned near an extensor pollicis longus and a flexor pollicis longus of the arm, the antennas 706b, 708b may be positioned near extensor muscles that produce extension of wrist and fingers, the antennas 706c, 708c may be positioned near a flexor digitorum profundus of the arm, and the antennas 706d, 708d may be positioned near flexion muscles that produce pronation of the arm and flexion of wrist and fingers. Of course, in other embodiments, different arrangements, position, and/or numbers of antennas and muscle groups may be possible.

Referring now to FIG. 10, another illustrative embodiment 1000 of a sensor device 106 is shown. The illustrative sensor device 1000 includes a frame 1002 that is sized large enough to surround a forearm of the user. The frame 1002 may be formed from plastic, metal, wood, or another rigid material. As shown, the frame 1002 is rectangular and includes four walls 1004. Of course, in other embodiments, the frame 1002 may have a different shape and/or arrangement. Each wall includes a corresponding inner surface 1006, and multiple antenna brackets 1008 are attached to the inner surfaces 1006. Each of the antenna brackets 1008 is configured to receive one or more antennas 108, cables, connectors, and/or other related components. Illustratively, the sensor device 1000 includes four antenna brackets 1008, and each antenna bracket 1008 is coupled to a corresponding transmit antenna 1010 and receive antenna 1012. Accordingly, the sensor device 1000 includes four transmit antennas 1010 and four receive antennas 1012. The illustrative antennas 1010, 1012 are each a monopole whip antenna. The frame 1002 includes an opening that defines a user volume 1014, and the antennas 1010, 1012 surround that user volume 1014. As shown, the antennas 1010, 1012 are elongated, and when an arm of the user is inserted into the user volume 1014, the antennas 1010, 1012 extend along the arm (i.e., parallel to a long axis of the arm). In some embodiments, one or more different types or arrangements of antennas 1010, 1012 may be used. For example, in some embodiments, each antenna 1010, 1012 may be a simple notch antenna formed from a notch in the shielding of a coaxial cable thereby allowing RF leakage.

As shown in FIG. 10, a user's arm 1016 may be inserted into the frame 1002, such that the user's forearm between the user's wrist 1018 and elbow 1020. When so inserted, muscles of the user's forearm are positioned within the user volume 1014. Thus, in the illustrative embodiment, muscles of the mid-forearm used for hand motion may be positioned within the user volume 1014. In some embodiments, the arm 106 may be inserted in a different position, such as closer to the user's wrist 1018.

Figure 11:
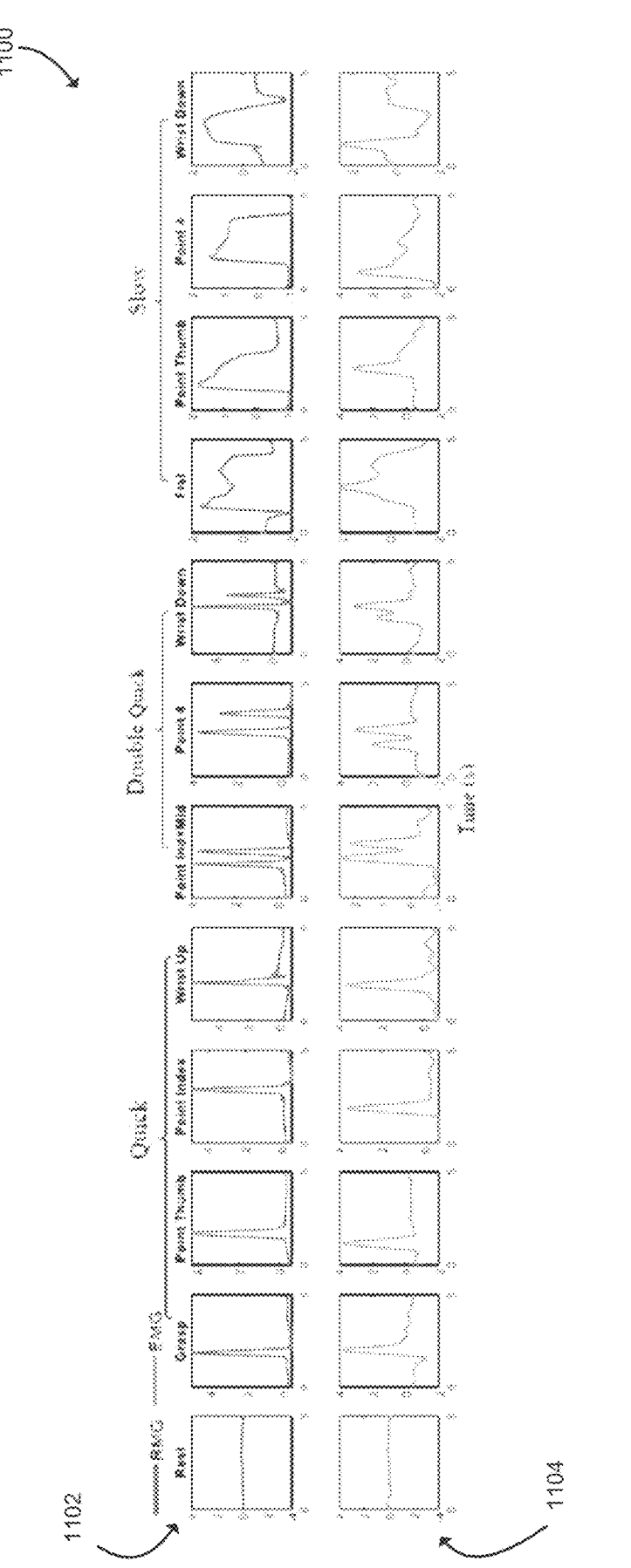
FIG. 11 is a diagram of experimental results including surface electromyography sensor signals that may be achieved with a system of FIGS. 1-2.

Referring now to FIG. 11, diagram 1100 illustrates experimental results that may be achieved with the illustrative system 100. Row 1102 includes charts illustrating time-domain signals for a single channel that may be captured by the system 100 using the sensor device 106 for multiple different gestures performed by a user. These time-domain signals may be referred to as radiomyography (RMG) signals. As described above, the RMG signals are generated by RF sensor signals coupling with muscle motion of the user, including deep muscle motion (for example, deep muscle layers of the user's forearm). Row 1104 includes charts illustrating time-domain signals for a single channel that may be received by an electromyography (EMG) sensor for the same gestures performed by the user. EMG estimates muscle motion by measuring neuromuscular activities from the electrodes placed on the bare skin of the forearm. The extracted delay between neural stimulation by sEMG and actual muscle actuation by RMG may be used for neuromuscular pathology and feedback control of electromyostimulation (EMS). The RMG signals in charts 1102 and the EMG signals in the charts 1104 are synchronized in time, which may allow for comparison and improved gesture recognition.

For example, as shown for quick and double quick gestures, both RMG and EMG presented sharp peaks corresponding to the fast muscle motion. However, compared with RMG, sEMG signals had longer duration of pulse waveforms and showed more peak tailing after the gesture motion terminated. For slow gestures, RMG showed a more consistent square-wave pattern from the holding period of gestures. The sEMG signal showed a shorter pulse duration for gestures that do not require continuous myoelectrical simulation such as the point-finger gestures. For other gestures that require continuous effort to maintain the position such as the wrist up/down, the sEMG pulse duration were extended. During "Rest" and between gestures with no intended hand motion, sEMG had more interference and ambiguity due to either hardware sources such as inconsistent electrode contact resistance or from biological sources such as the neural signals from vital signs.

Based on the above, there is typically a time delay between EMG signal activity and corresponding RMG signal activity. In an experiment, peak detection was performed for 14 quick gestures. Based on the detected peaks, it was determined that the Pearson correlation coefficient r=0.929 and that the mean time difference is a delay of 0.183 s. That is, the RMG signals and the sEMG signals have a high temporal correlation and a consistent time lag. This time delay may be measured, and changes in delay may be indicative of user fatigue or other physical phenomena.

Figure 12:
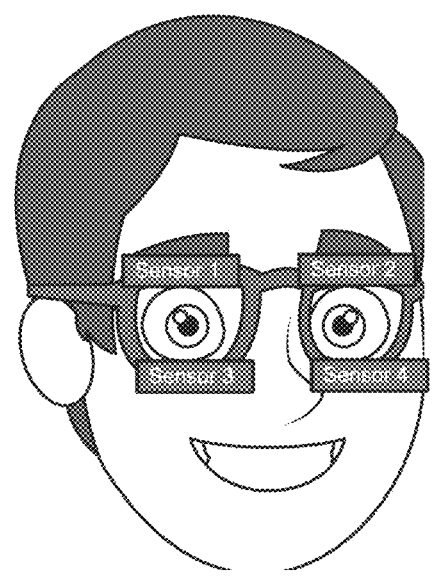
FIG. 12 is a diagram showing possible sensor placement on glasses worn by a user.
Figure 13:
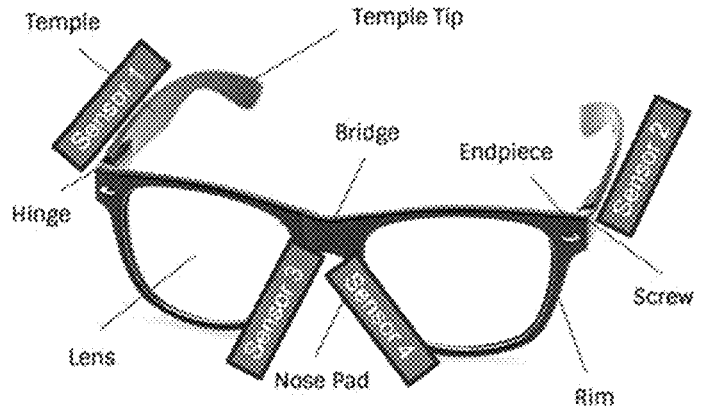
FIG. 13 is a labelled diagram showing possible sensor placement on glasses.

MIMO RMG can also be deployed on smart glasses and goggles for human computer interface (HCI) and VR/AR (virtual reality/augmented reality) applications as shown in FIGS. 12 and 13. In an illustrative embodiment, the four sensors can be placed on glasses, as shown in FIG. 12 in at least two possible ways. Placement on the lens frame can observe full facial expressions, and placement on temple and nose pad areas can observe the eye movement and gaze tracking. Depending on the number of gestures and gaze resolution, the bottom two sensors (Sensors 3 and 4) can be omitted, with Sensors 1 and 2 on the left and right sides. Of course, other combinations and arrangements of sensors are contemplated. This multiple-input-multiple-output (MIMO) RMG sensor can perform gaze tracking, facial motion (blink, wink, and eyebrow raise/pucker/furrow), and respiration.

Figure 14:
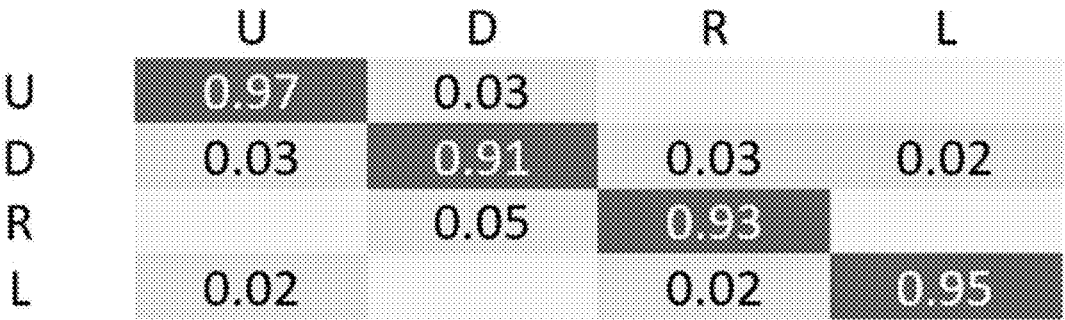
FIG. 14 is a table showing gaze tracking by classifying the eye movement in four directions from the center gaze point by RMG deployed on glasses and facemasks; the average accuracy is 94%.
Figure 15:
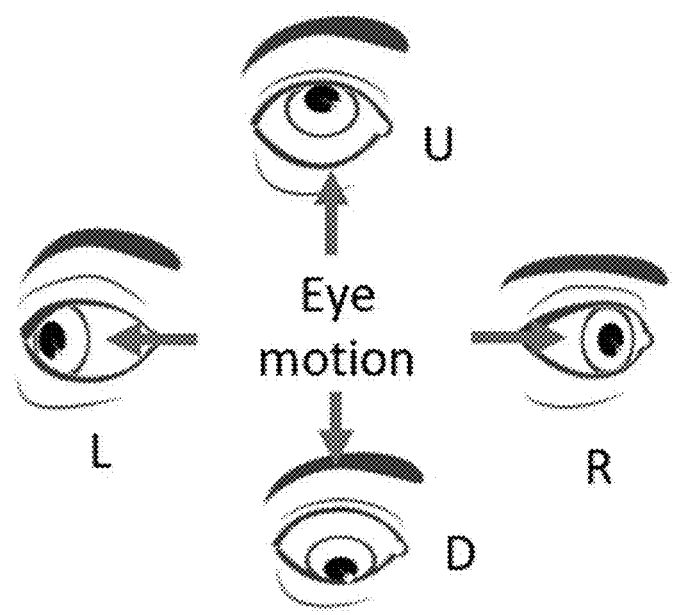
FIG. 15 is a diagram illustrating the different directions of eye movement related to the table of FIG. 14.

Gaze tracking can be performed from classifying the eye movement away from the center gaze point as the relaxed position (no muscle strain). The 8 possible eye movements that change the gaze point are shown in FIGS. 14 and 15. Resolution is estimated at 10° in one direction by the gaze point distance at 10 cm and focal plane at 60 cm.

Figure 16:
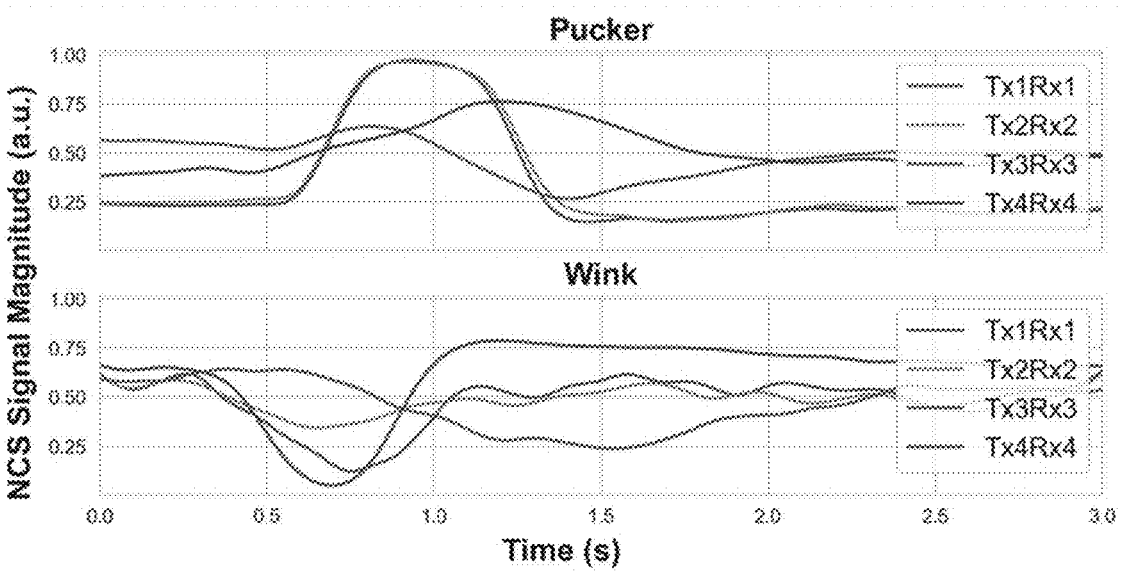
FIG. 16 is a chart of representative waveforms for different MIMO channels at different facial expression.
Figure 17:
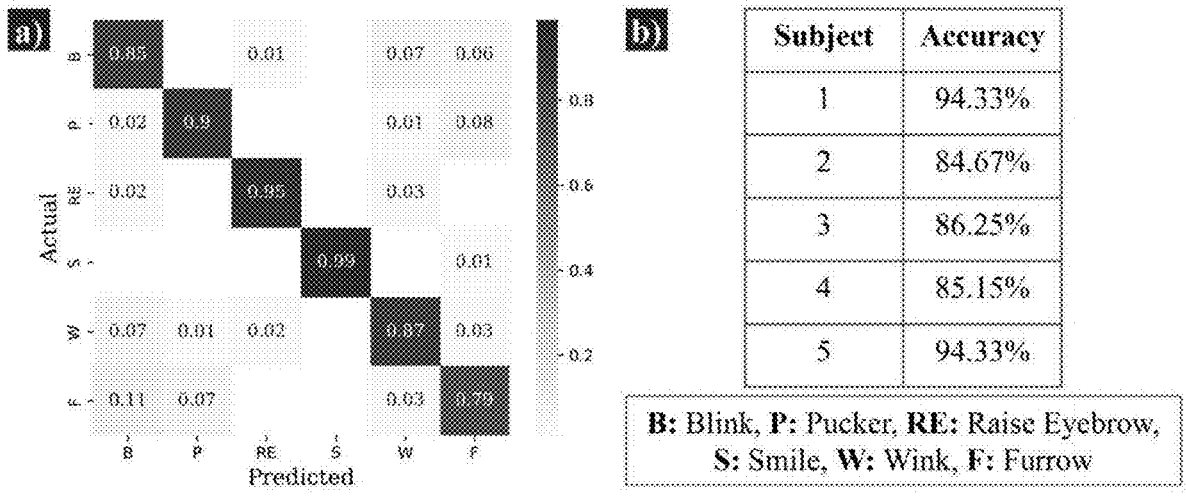
FIG. 17 is a confusion matrix for average classification of blink (B), pucker, (P), raising eyebrow (RE), smile(S), wink (W), and furrow (F)

Six different facial expressions were initially designed to assist HCI evaluation: blink (B), pucker (P), raising eyebrow (RE), smile(S), wink (W) and furrow (F). MIMO channels increased the system entropy and classification accuracy significantly, and the representative waveforms from selected channels are shown in FIG. 16. We tested the setup on five participants and used the RMG classification algorithms described in the main patent. The confusion matrix of classification and accuracy for individual participants are shown in FIG. 17. Personal training can be helpful to achieve the high accuracy. Also, transfer learning as described herein can be used to reduce the required number of test cases in personal training.

Figure 18:
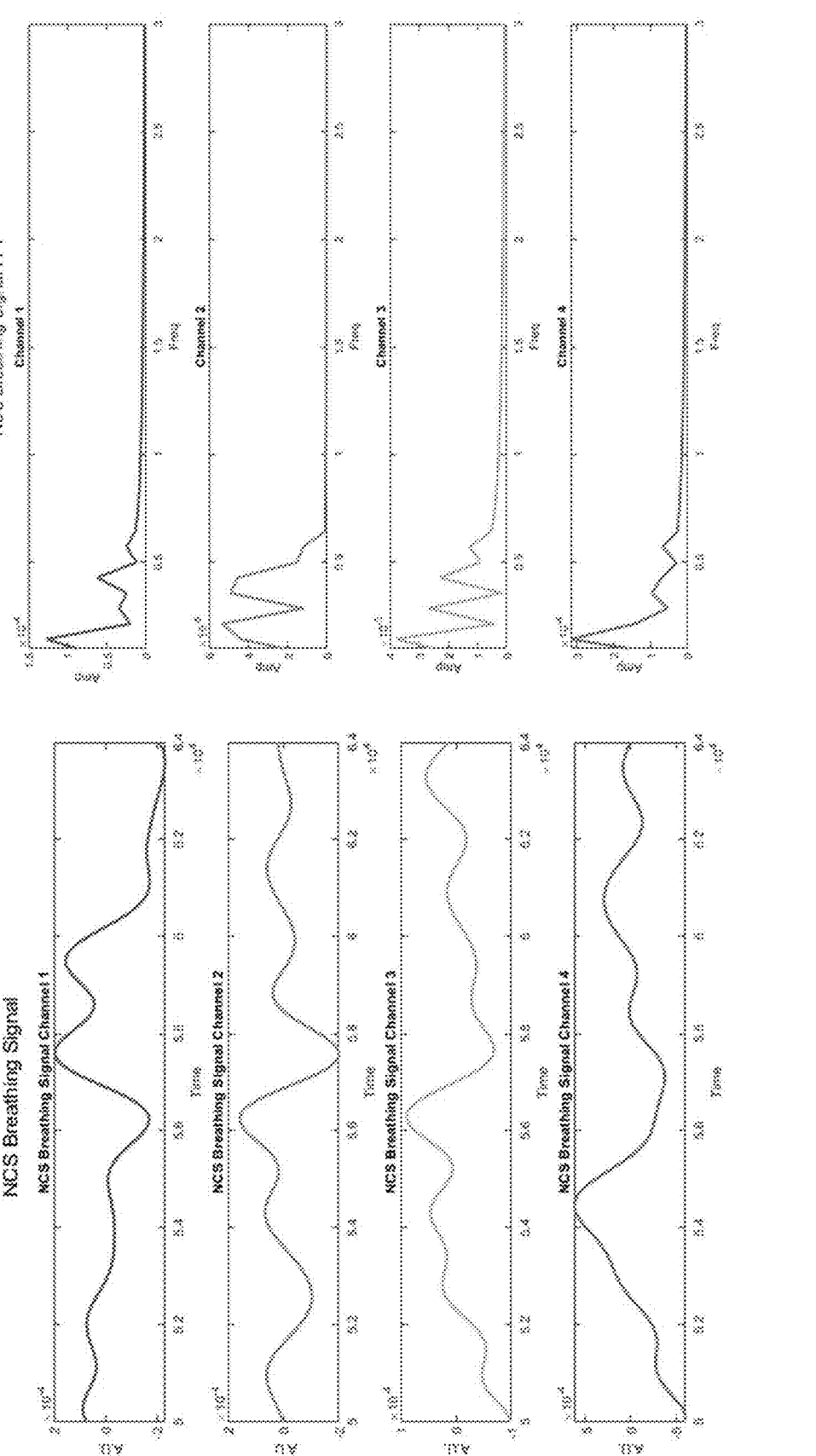
FIG. 18 is a series of charts showing time-domain (left) and frequency-domain (right) respiration monitoring from various channels, the redundant channel information can render higher accuracy and reliability by analyzing the signal-to-noise ratio (SNR) in each channel, here Channels 1 and 4 have the higher SNR.

Even when the sensors are away from the thorax and diaphragm, respiration can still be captured either from skeletal coupling during spine motion or from the extended capture volume. As MIMO provides redundant channels to measure the same respiration motion as shown in FIG. 18, the signal quality or the signal-to-noise ratio (SNR) can be used to determine which combination of channels gives the more reliable and accurate respiration waveforms.

As described above, a near-field radio sensing system for identifying facial activity may include a sensor device having multiple transmitters and corresponding receivers coupled to a wearable device, such as glasses, facemasks, or goggles. A computing device coupled to the sensor device illustratively includes a sensor driver and a classifier.

The sensor driver transmits multiple radio frequency signals with the transmitters of the sensor device. A near field of the radio frequency signals couples with selected tissue of a face of the user. The radio frequency may be in the range of 300 MHz-6 GHz for effective near-field coupling, for example. The selected tissue of the face may include, for example, tissues or muscles adjacent an eye of the user, an eyebrow of the user, a cheek of the user, or tissues or muscles adjacent a mouth of the user. In particular, the selected tissue may include extraocular muscles that control gaze direction and movement of the user's eye, such as the superior rectus, inferior rectus, medial rectus, lateral rectus, inferior oblique, and superior oblique. The sensor driver receives time-domain signals with the receivers of the sensor device in response to transmitting the radio frequency signals.

A classifier classifies the time-domain signals into one or more distinct states selected from multiple distinct states of the selected tissue that correspond to the received time-domain signals. The classifier may be embodied as a trained machine learning model, a deep neural network, or an optimization-based calculation such as dynamic time warping (DTW).

Classifying the time-domain signals into the one or more distinct states may include identifying facial expressions of the user, identifying gaze direction of the user's eye, identifying eye motion, facial motion, or other facial activity.

Facial expressions identified by the classifier may be selected from one or more predetermined facial expressions such as a blink, a pucker, a raising eyebrow, a simile, a wink, or a furrow. Other facial expressions may be identified in some embodiments, Gaze direction identified by the classifier may include a direction (e.g., up, down, left, right, or other set of directions), a gaze angle, a rotation or partial rotation, or other direction of the user's eye. Gaze angle may be determined with a resolution that is determined by the signal-to-noise ratio and the number of the transmitters and receivers.

Classifying the time-domain signals may include identifying respiration of the user.

The wearable device may include an augmented reality headset, a mixed reality headset, an extended reality headset, a virtual reality headset, or other reality-based computing device or input/output device. The one or more distinct states determined by the classifier may be used by an interface controller as input to a virtual reality, mixed reality, extended reality, augmented reality, or other reality-based human-computer interface.

Each of transmitters and the receivers may be embodied as an antenna, a leaky waveguide, or other RF transmitter and/or receiver.

The wearable device may be configured to be secured to the user in the form of glasses, facemasks, or goggles, and when secured to the user, a pair of transmitter and receiver is positioned to direct radio-frequency signals to a predetermined location of the user's face. The predetermined location corresponds to the selected tissue for near-field coupling.

In an embodiment, the wearable device comprises an eyeglasses frame, which may include temples, lens frames including nosepieces, and a bridge connecting the lens frames. The sensor device may be coupled to the temples, the bridge, or lens frames to read out an adjacent muscle or tissue actuation of the user.

In an embodiment, the system includes sensor modules that each include a transmitter and a receiver. In an embodiment, a sensor module may be coupled to an upper part of each of the lens frames. Additionally, in an embodiment, another sensor module may be coupled to a lower part of each of the lens frames. In yet another embodiment, a sensor module may be coupled to each of the temples. Additionally, in an embodiment, a sensor module may be coupled to each of the nosepieces.

In an embodiment, the wearable device comprises a face shield or face mask. In an embodiment, the sensor modules may be coupled to the face shield or face mask.

The invention claimed is:

1. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein the sensor device is configured for securement to a limb of a user to extend from a first portion of the limb to a second portion of the limb to dispose the plurality of transmit antennas and the plurality of receive antennas adjacent to the limb so that the near field of the plurality of radio-frequency signals couples with muscles of the limb, and further comprising one condition selected from the following conditions:

wherein at least some of the plurality of transmit antennas and the plurality of receive antennas of the sensor device are spaced apart along at least a portion of a length of the sensor device, wherein at least some of the plurality of transmit antennas and the plurality of receive antennas of the sensor device are spaced apart circumferentially about at least a portion of a circumference of the sensor device, or wherein the plurality of transmit antennas and the plurality of receive antennas comprise:

(i) a first pair of transmit antenna and receive antenna disposed at a first position of the sensor device to direct radio-frequency signals to a user's extensor pollicis longus and a flexor pollicis longus, (ii) a second pair of transmit antenna and receive antenna disposed at a second position of the sensor device to direct radio-frequency signals to a user's extensor muscles that produce extension of wrist and fingers, (iii) a third pair of transmit antenna and receive antenna disposed at a third position of the sensor device to direct radio-frequency signals to a user's flexion muscles that produce pronation of the arm and flexion of wrist and fingers, and (iv) a fourth pair of transmit antenna and receive antenna disposed at a fourth position of the sensor device to direct radio-frequency signals to a user's a flexor digitorum profundus.

2. The system of claim 1, wherein the sensor device comprises a cuff configured for attachment to a forearm, and wherein the classifier is configured to classify the plurality of time-domain signals with a trained machine learning model into a plurality of distinct states of the selected soft tissue of the forearm corresponding to a plurality of hand gestures.

3. The system of claim 1, wherein the one or more distinct states comprises:

(i) a type of voluntary movement comprising predetermined motion of one or more fingers, a wrist, a hand, a leg, or an eye, (ii) a type of voluntary movement for an air-writing gesture of a letter, number, or symbol, or any combinations thereof.

4. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein each of the plurality of transmit antennas and the plurality of receive antennas comprises a monopole whip antenna or a coaxial cable with a notch structure.

5. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein to receive the plurality of time-domain signals comprises to receive near-field coherent sensing signals.

6. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein the radio-frequency signal has a carrier frequency of about 900 MHz, about 2.4 GHz, or between about 900 MHz and 2.4 GHz.

7. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein to transmit the plurality of radio-frequency signals with the plurality of transmit antennas comprises to multiplex the plurality of radio-frequency signals.

8. The system of claim 7, wherein to multiplex the plurality of radio-frequency signals comprises to perform frequency-division multiplexing or code-division multiplexing.

9. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein the trained machine learning model comprises a convolutional neural network or a vision transformer model.

10. The system of claim 9, wherein the one or more distinct states comprises:

(i) a type of voluntary movement comprising predetermined motion of one or more fingers, a wrist, a hand, a leg, or an eye, (ii) a type of voluntary movement for an air-writing gesture of a letter, number, or symbol, or any combinations thereof.

11. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein the computing device further comprises a model trainer configured to:

perform transfer learning on the trained machine learning model with a calibration data set;

wherein to classify the plurality of time-domain signals comprises to classify the plurality of time-domain signals in response to performance of the transfer learning.

12. The system of claim 11, wherein the model trainer is further configured to:

(i) to determine whether a new user is associated with the sensor device or a new orientation is associated with the sensor device, wherein to perform the transfer learning comprises to perform transfer learning in response to a determination that a new user or a new orientation is associated with the sensor device, or (ii) configured to generate the calibration data set by labeling of the plurality of time-domain signals with one or more predetermined gesture classifications.

13. A near-field radio sensing system for identifying muscle activity of a user, the system comprising:

a sensor device comprising a plurality of transmit antennas and a corresponding plurality of receive antennas; and a computing device coupled to the sensor device, the computing device comprising:

a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein the computing device further comprises:

(i) an interface controller to use the one or more distinct states as an input to a human-computer interface, (ii) an input pre-processor to combine the plurality of time-domain signals with sensor data received from a surface electromyography sensor, or both (i) and (ii).

14. The system of claim 13, wherein the one or more distinct states comprises:

(i) a type of voluntary movement comprising predetermined motion of one or more fingers, a wrist, a hand, a leg, or an eye, (ii) a type of voluntary movement for an air-writing gesture of a letter, number, or symbol, or any combinations thereof.

15. A near-field radio sensing system for identifying muscle activity of a user, the system comprising:
a sensor device comprising a plurality of transmit antennas and a corresponding plurality of receive antennas; and
a computing device coupled to the sensor device, the computing device comprising:
a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and
a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network,
wherein:
the computing device further comprises an input pre-processor to transform each of the time-domain signals to one or more two-dimensional spectrograms; and
the classifier is to classify the plurality of two-dimensional spectrograms with the trained machine learning model to generate the one or more distinct states.

16. The system of claim 15, wherein to transform each of the time-domain signals to one or more two-dimensional spectrograms comprises to perform a short-time Fourier transform having a first window length, and optionally a second window length, wherein the second window length is larger than the first window length.

17. The system of claim 15, wherein to transform each of the time-domain signals to one or more two-dimensional spectrograms comprises to perform a continuous wavelet transform with a first predetermined mother wavelet or a plurality of continuous wavelet transforms with a plurality of predetermined mother wavelets, wherein the plurality of predetermined mother wavelets comprises a Ricker wavelet, a Gaussian wavelet, and a Morelet wavelet.

18. A near-field radio sensing system for identifying muscle activity of a user, the system comprising:
a sensor device comprising a plurality of transmit antennas and a corresponding plurality of receive antennas; and
a computing device coupled to the sensor device, the computing device comprising:
a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and
a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network, wherein the sensor driver is further to demultiplex the plurality of time-domain signals into a plurality of demultiplexed time-domain signals, wherein each of the demultiplexed time-domain signals is associated with a transmit antenna and a receive antenna.

19. The system of claim 18, wherein the computing device further comprises an input pre-processor to:
generate a plurality of augmented time-domain signals based on the demultiplexed time-domain signals, wherein to generate the plurality of augmented time-domain signals comprises to generate a phase time-domain signal for each demultiplexed time-domain signal, an amplitude time-domain signal for each demultiplexed time-domain signal, or a complex number signal for each demultiplexed time-domain signal; and
generate a plurality of pre-processed time-domain signals by pre-processing the augmented time-domain signals, wherein to pre-process the augmented time-domain signals comprises:
to segment the augmented time-domain signals to classify a gesture,
to filter the augmented time-domain signals with a bandpass filter, optionally the filter has a pass band between about 0.1 Hz to 5 Hz,
to normalize the augmented time-domain signals,
to detrend the augmented time-domain signals by subtraction of a linear best fit line from each augmented time-domain signal or
any combinations thereof;
wherein to transform each of the time-domain signals comprises to transform each of the pre-processed time-domain signals.

20. A method for non-contact measuring of soft tissue motion of a user, the method comprising:
engaging a near-field radio sensing system for identifying muscle activity of a user, the system comprising:
a sensor device comprising a plurality of transmit antennas and a corresponding plurality of receive antennas; and
a computing device coupled to the sensor device, the computing device comprising:
a sensor driver to (i) transmit a plurality of radio frequency signals with the transmit antennas of the sensor device, wherein a near field of the plurality of radio frequency signals couples with selected soft tissue of a body part of the user, and (ii) receive a plurality of time-domain signals with the receive antennas of the sensor device in response to transmission of the plurality of radio frequency signals; and
a classifier to classify the plurality of time-domain signals with a trained machine learning model into one or more distinct states, selected from a plurality of distinct states of the selected soft tissue corresponding to the received plurality of time-domain signals, wherein the trained machine learning model comprises a deep neural network,
transmitting, using the sensor driver, the plurality of radio-frequency signals from the plurality of transmit antennas disposed at a plurality of first locations adjacent the user's body part into the user's body part to cause a near field of the plurality of radio-frequency signals to couple inside the user's body part to generate the plurality of time-domain signals;

receiving the plurality of time-domain signals with the plurality of receive antennas disposed at a plurality of second locations adjacent the user's body part; and classifying the plurality of time-domain signals, using the computing device with the trained machine learning model, into one or more distinct states, selected from the plurality of distinct states of the selected soft tissue corresponding to the received plurality of time-domain signals.

* * * * *